E. P. HUTTGER.
CIGAR MANUFACTURING MACHINE.
APPLICATION FILED DEC. 16, 1916.

1,289,785.

Patented Dec. 31, 1918.
18 SHEETS—SHEET 2.

INVENTOR
Edward P. Huttger
BY Victor J. Evans
ATTORNEY

WITNESSES

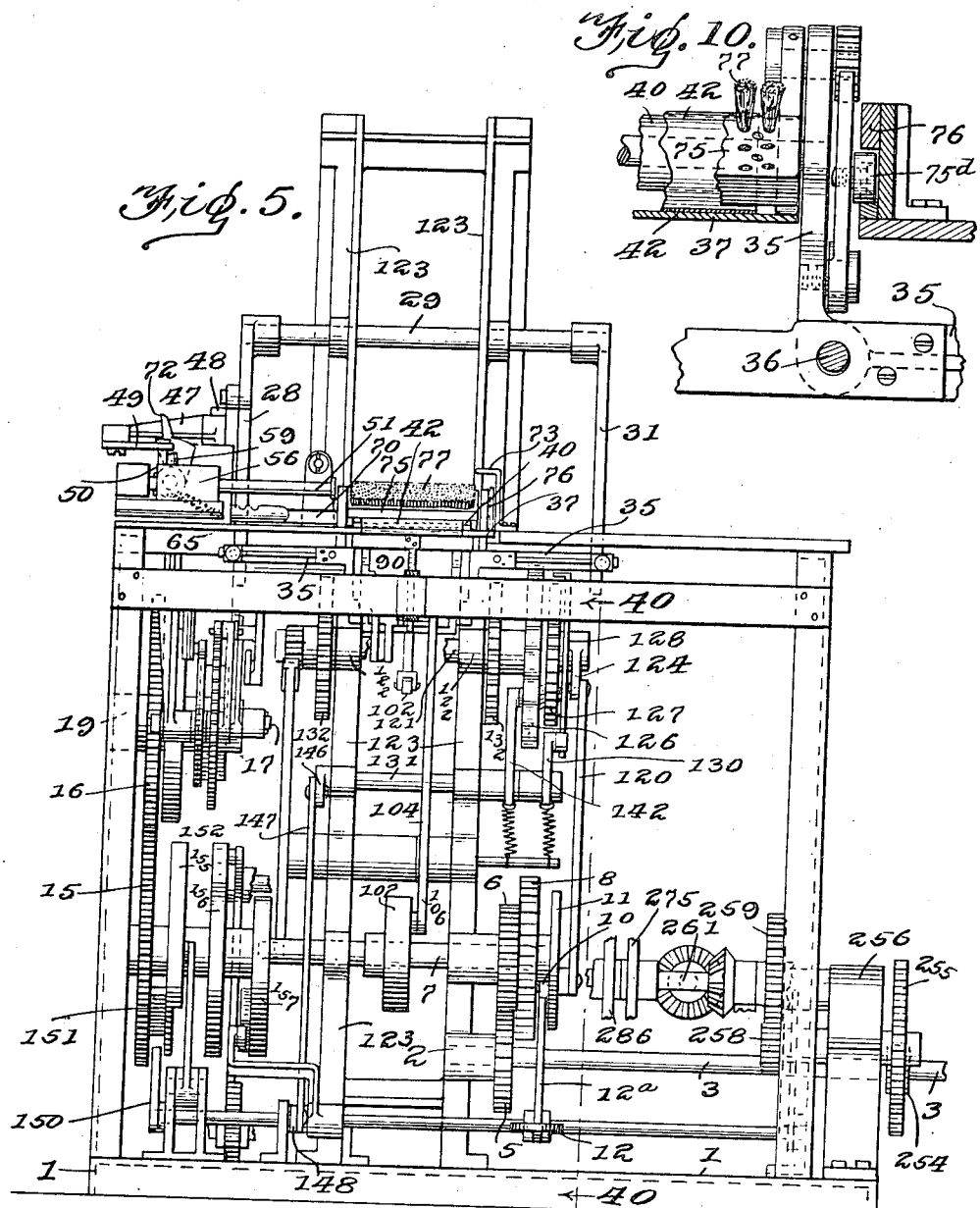

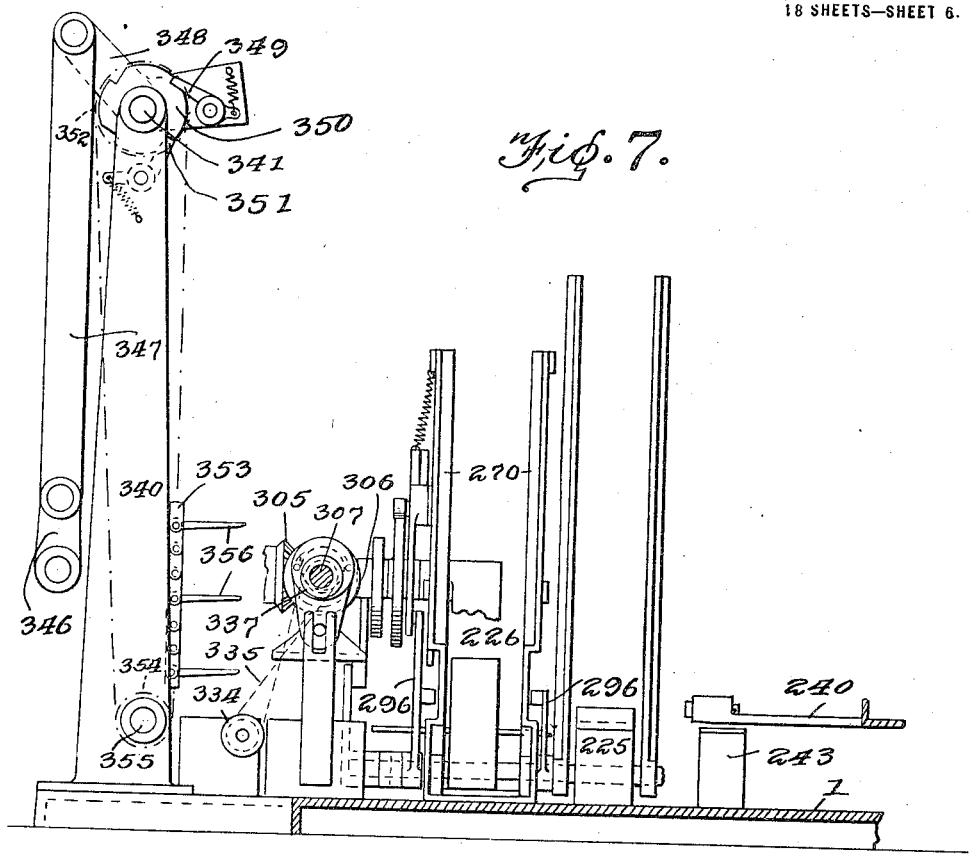
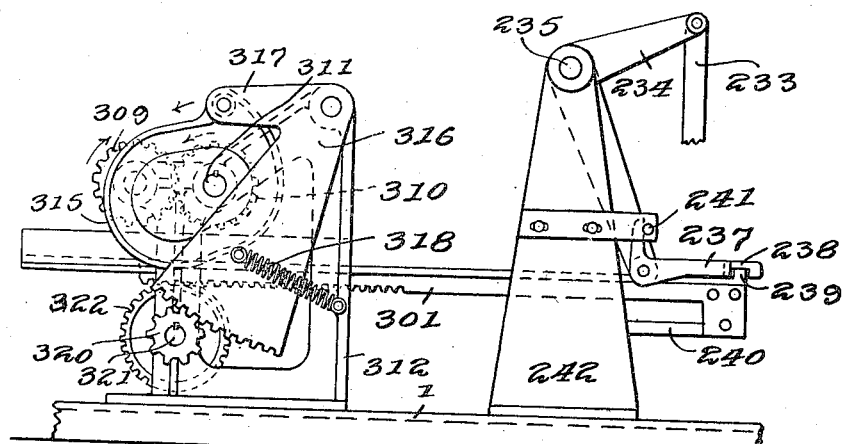

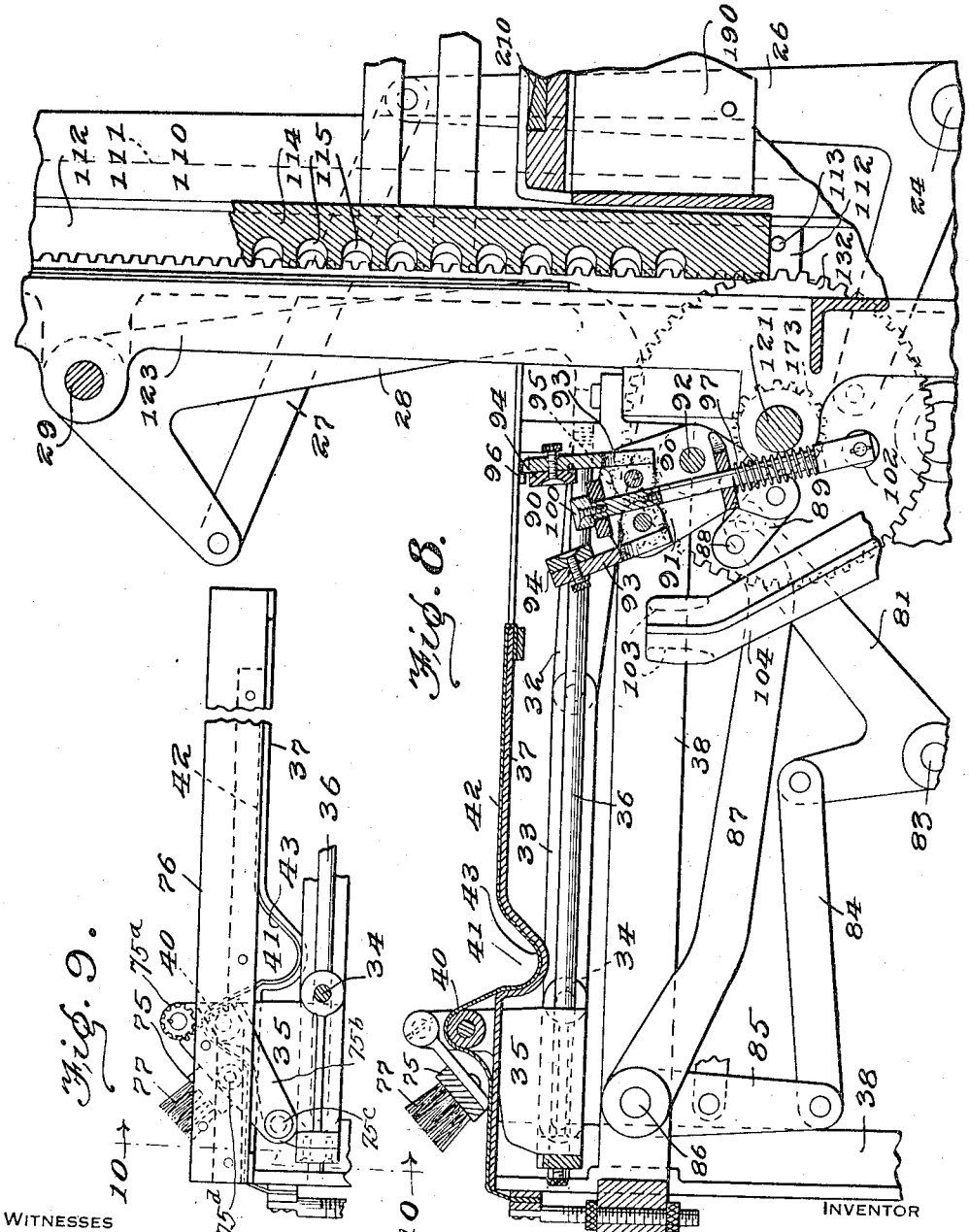

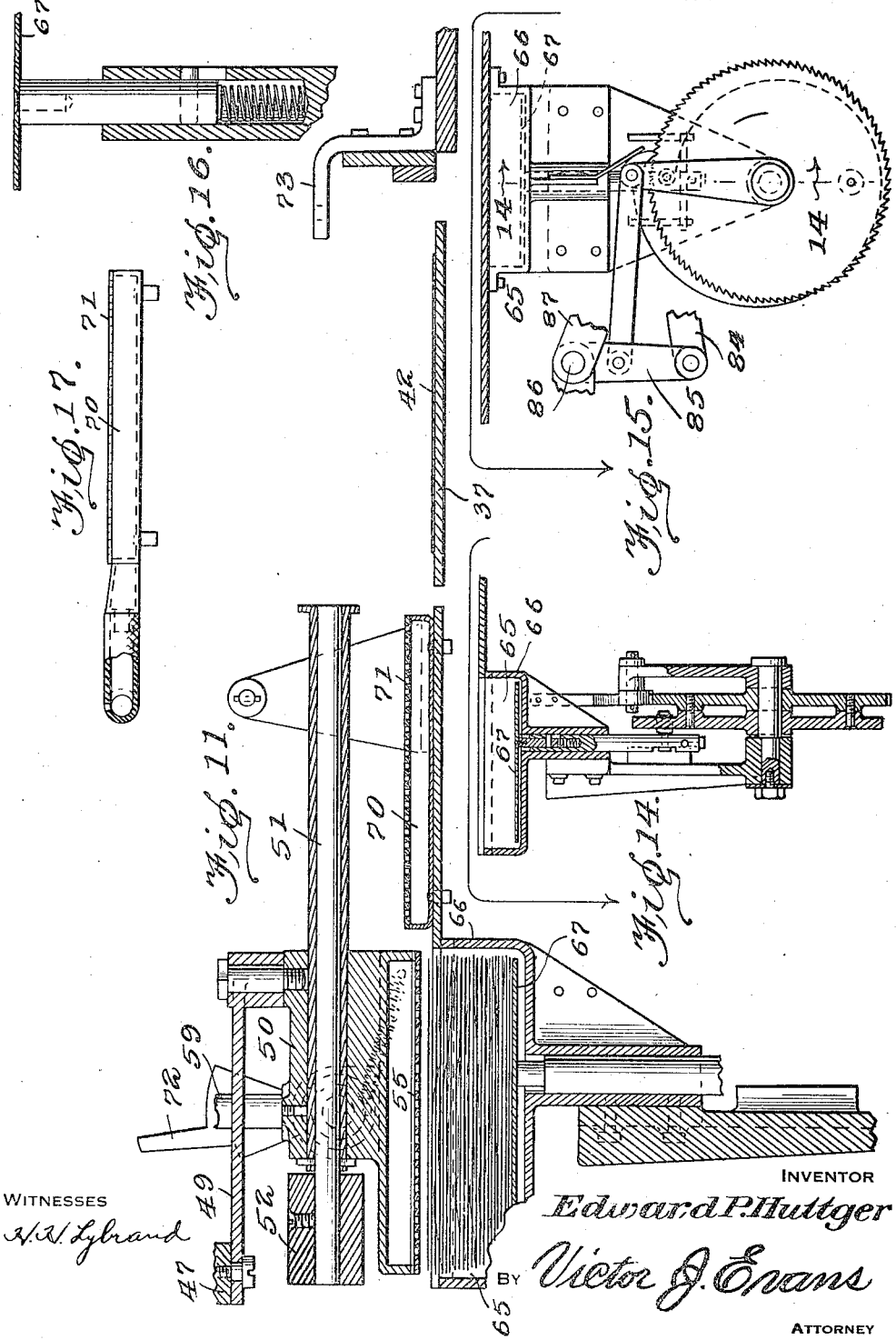

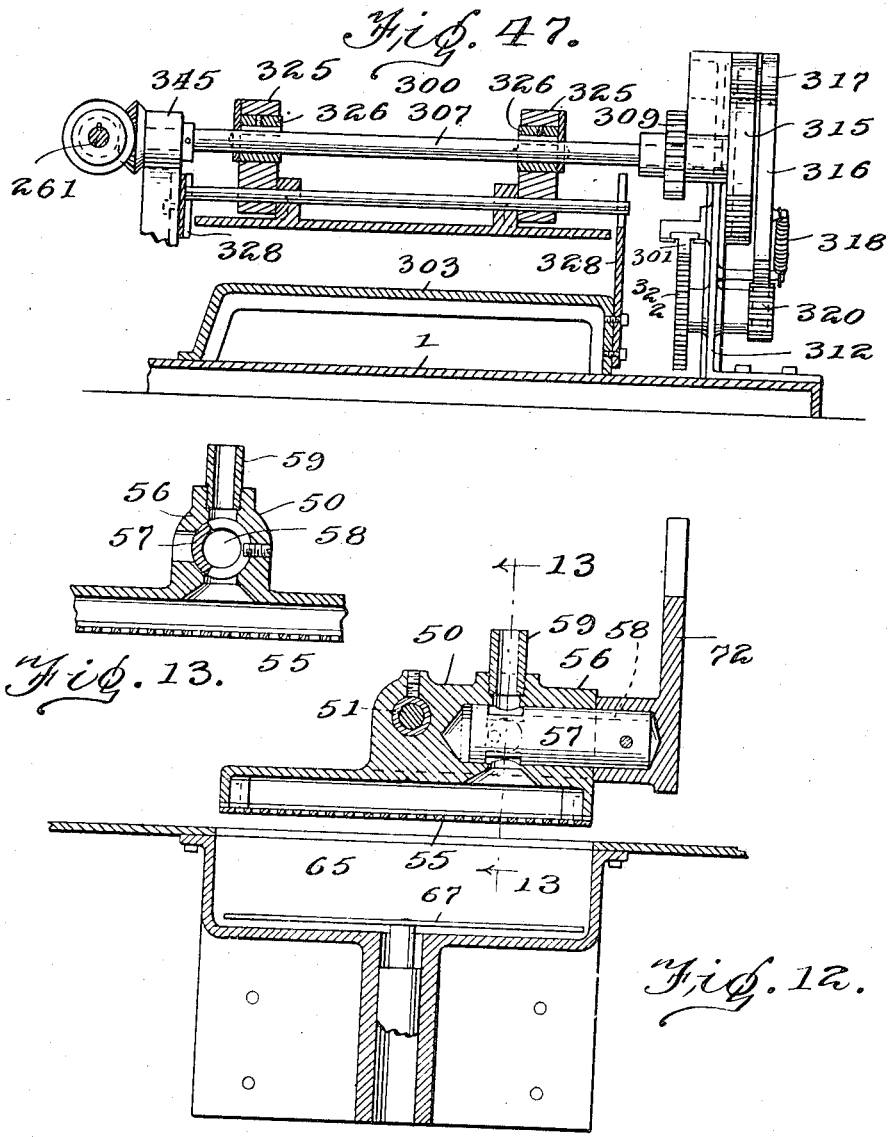

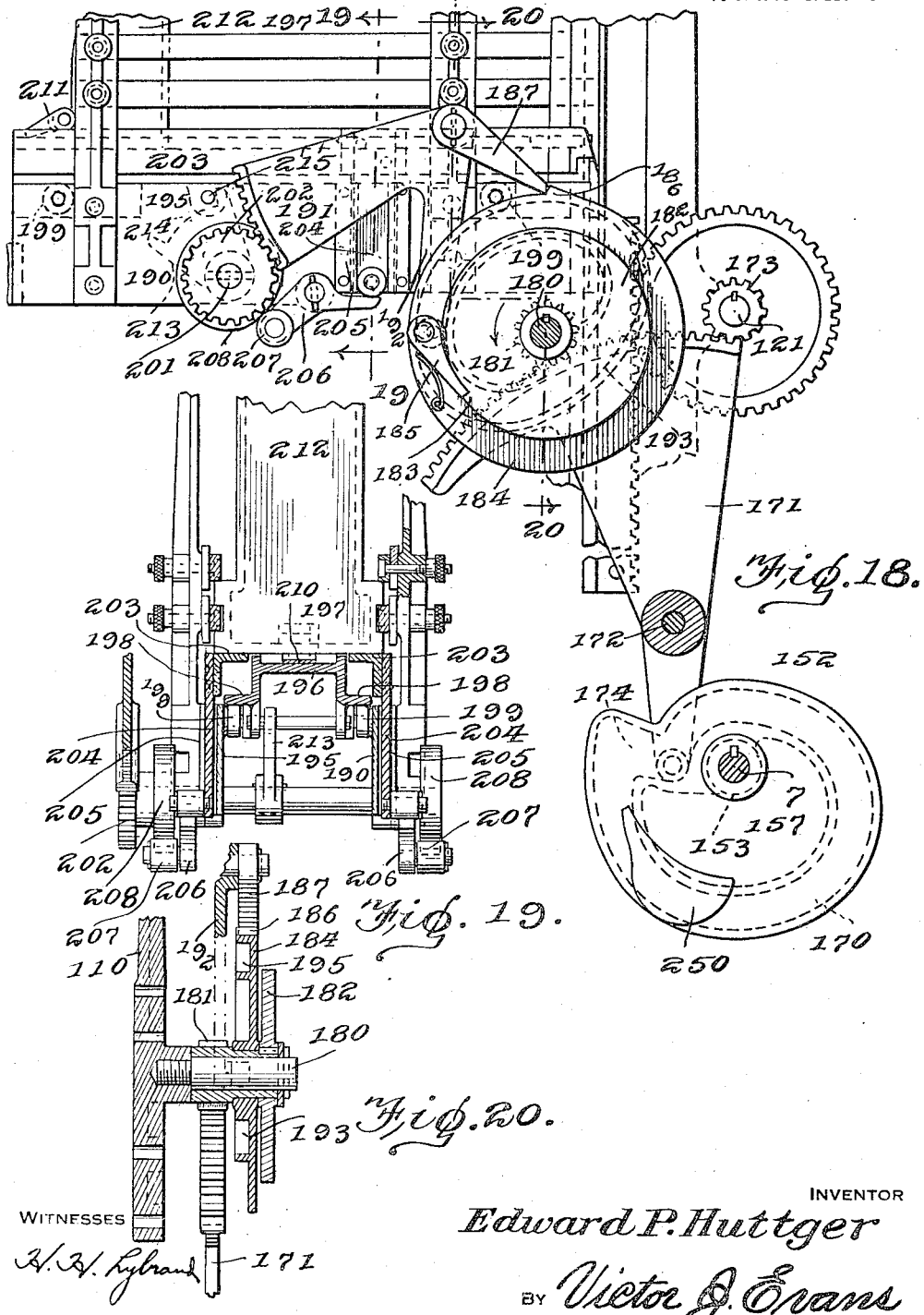

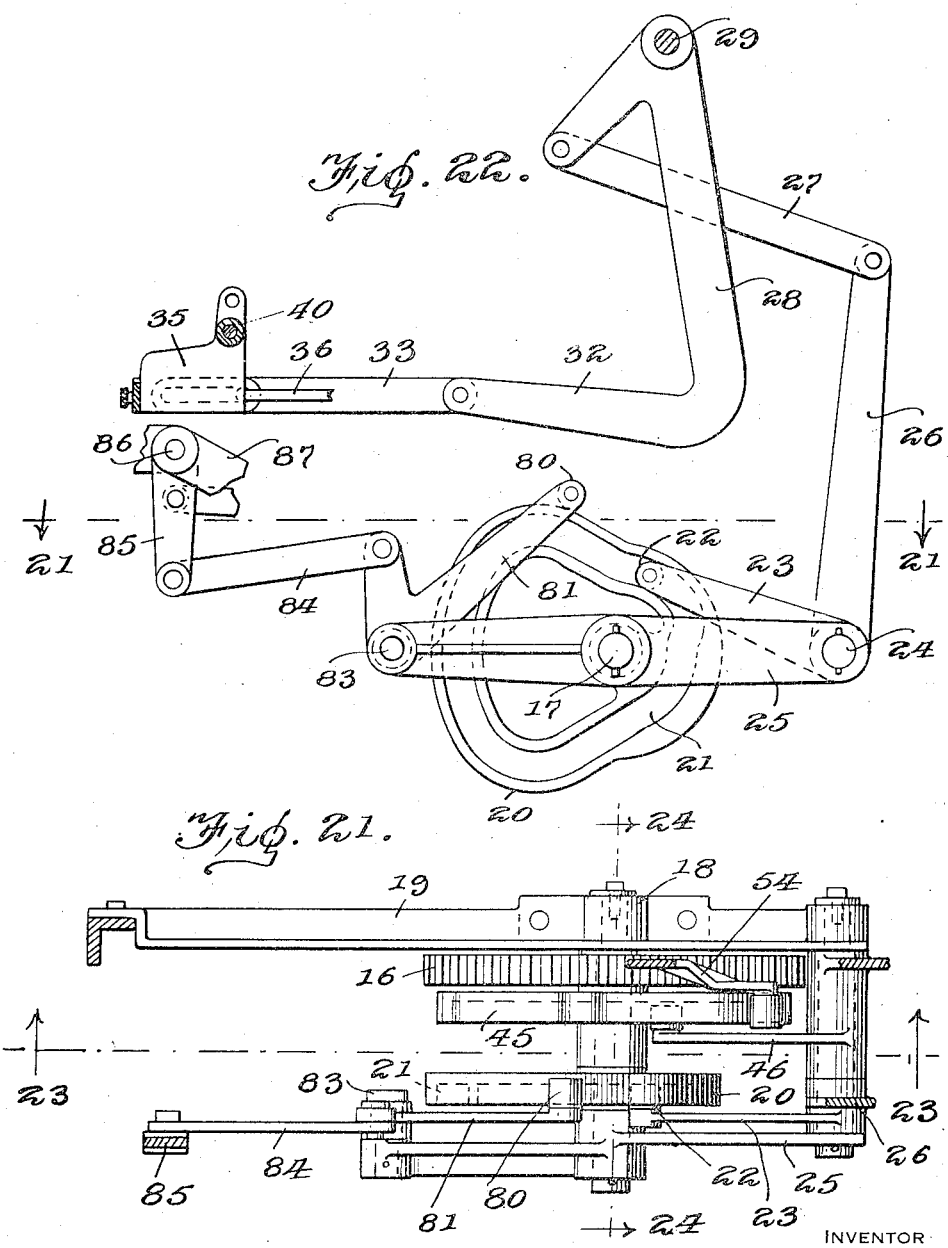

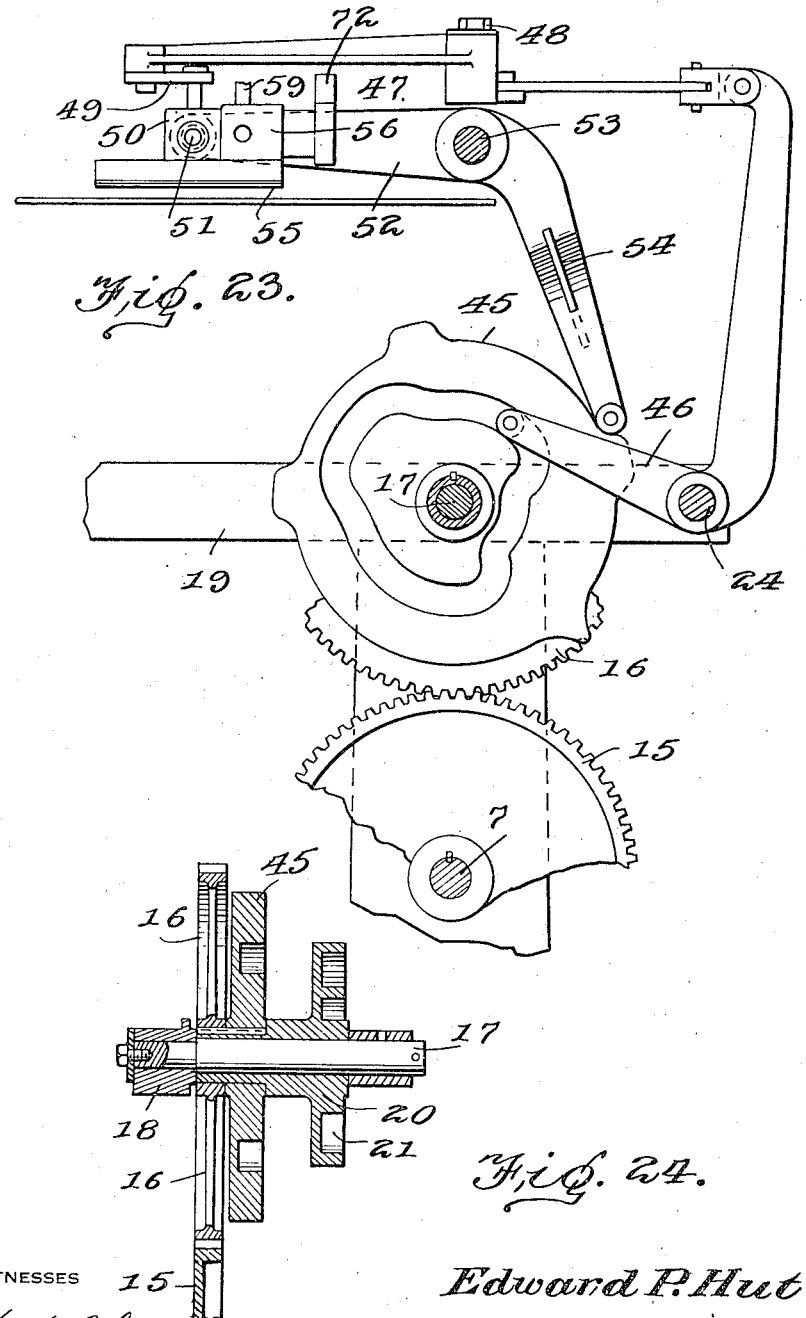

E. P. HUTTGER.
CIGAR MANUFACTURING MACHINE.
APPLICATION FILED DEC. 16, 1916.

1,289,785.

Patented Dec. 31, 1918.
18 SHEETS—SHEET 13.

Witnesses
H. H. Lybrand

Inventor
Edward P. Huttger
By Victor J. Evans
Attorney

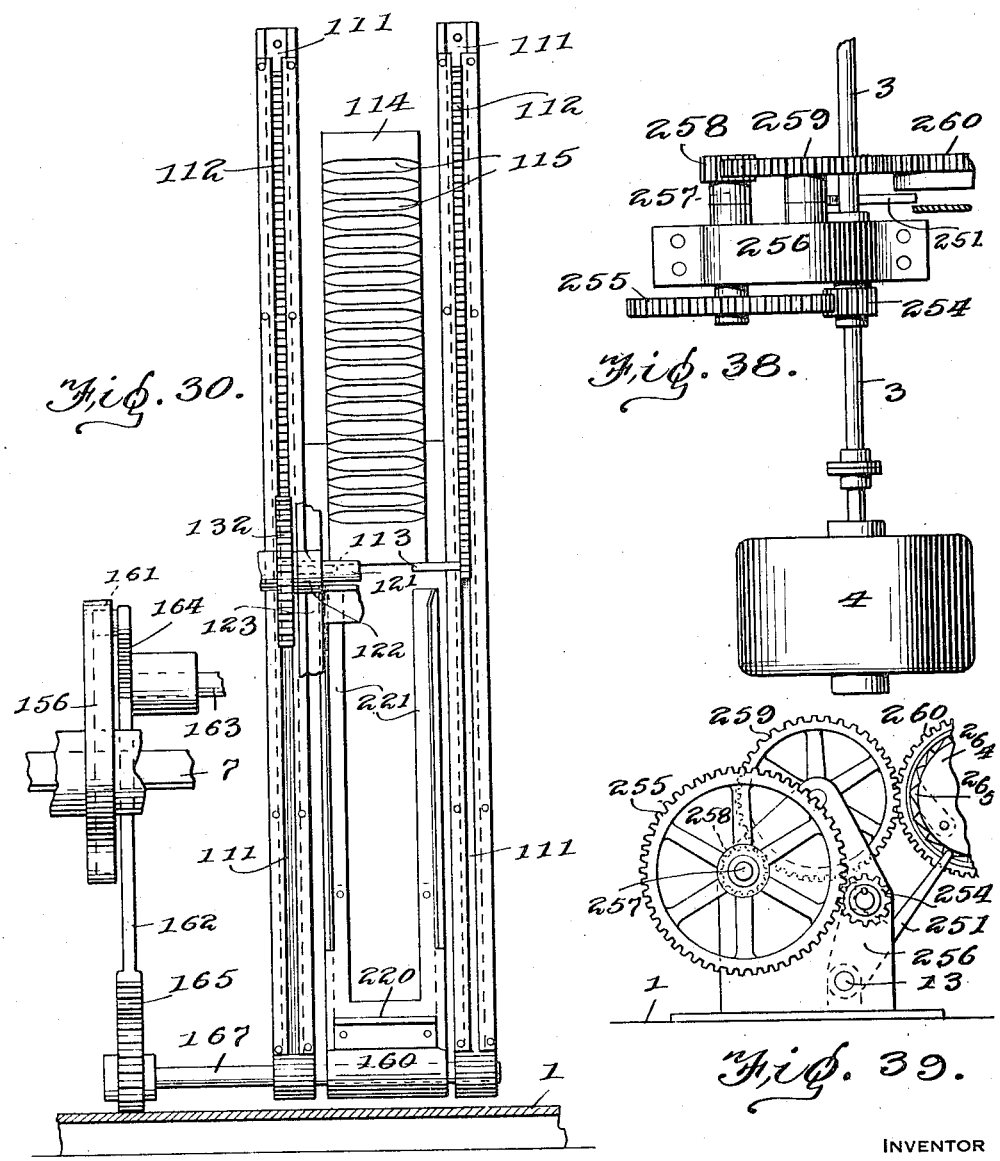

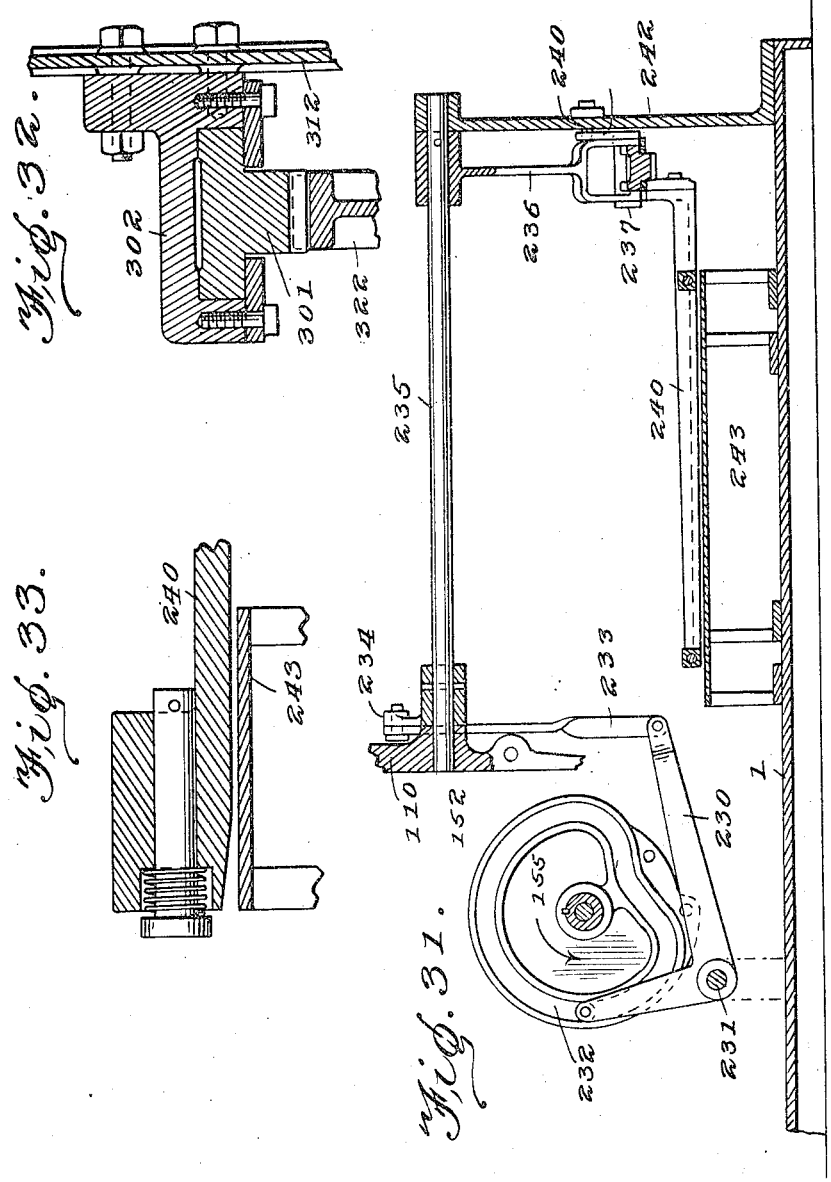

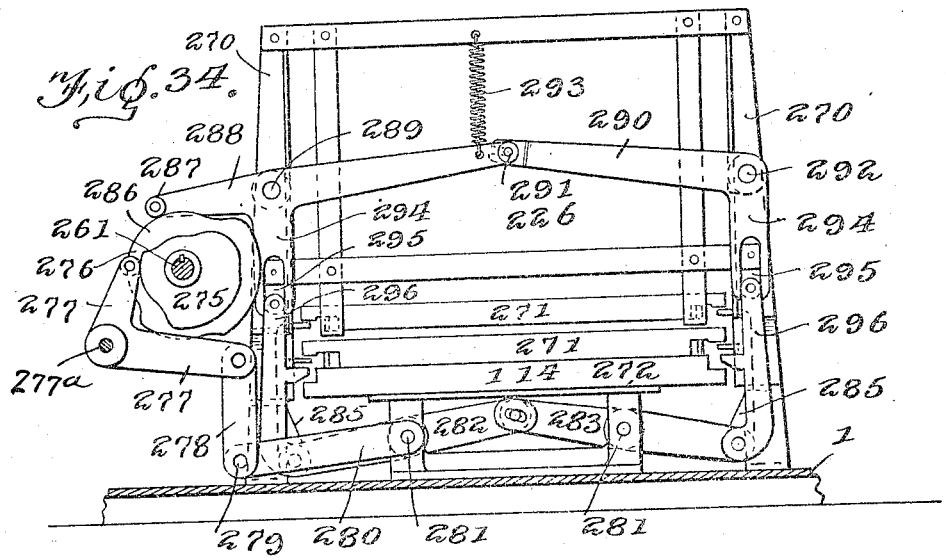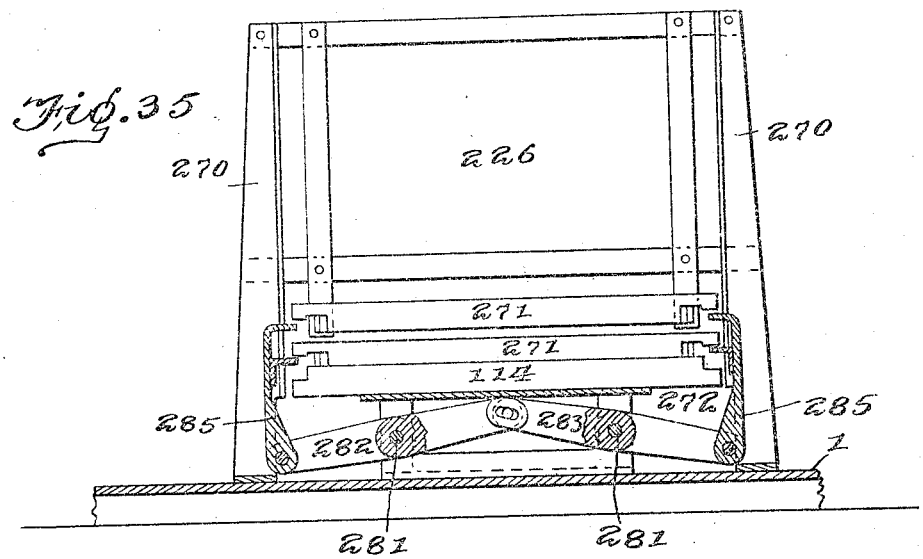

E. P. HUTTGER.
CIGAR MANUFACTURING MACHINE.
APPLICATION FILED DEC. 16, 1916.

1,289,785.

Patented Dec. 31, 1918.
18 SHEETS—SHEET 17.

INVENTOR
Edward P. Huttger

WITNESSES

BY Victor J. Evans
ATTORNEY

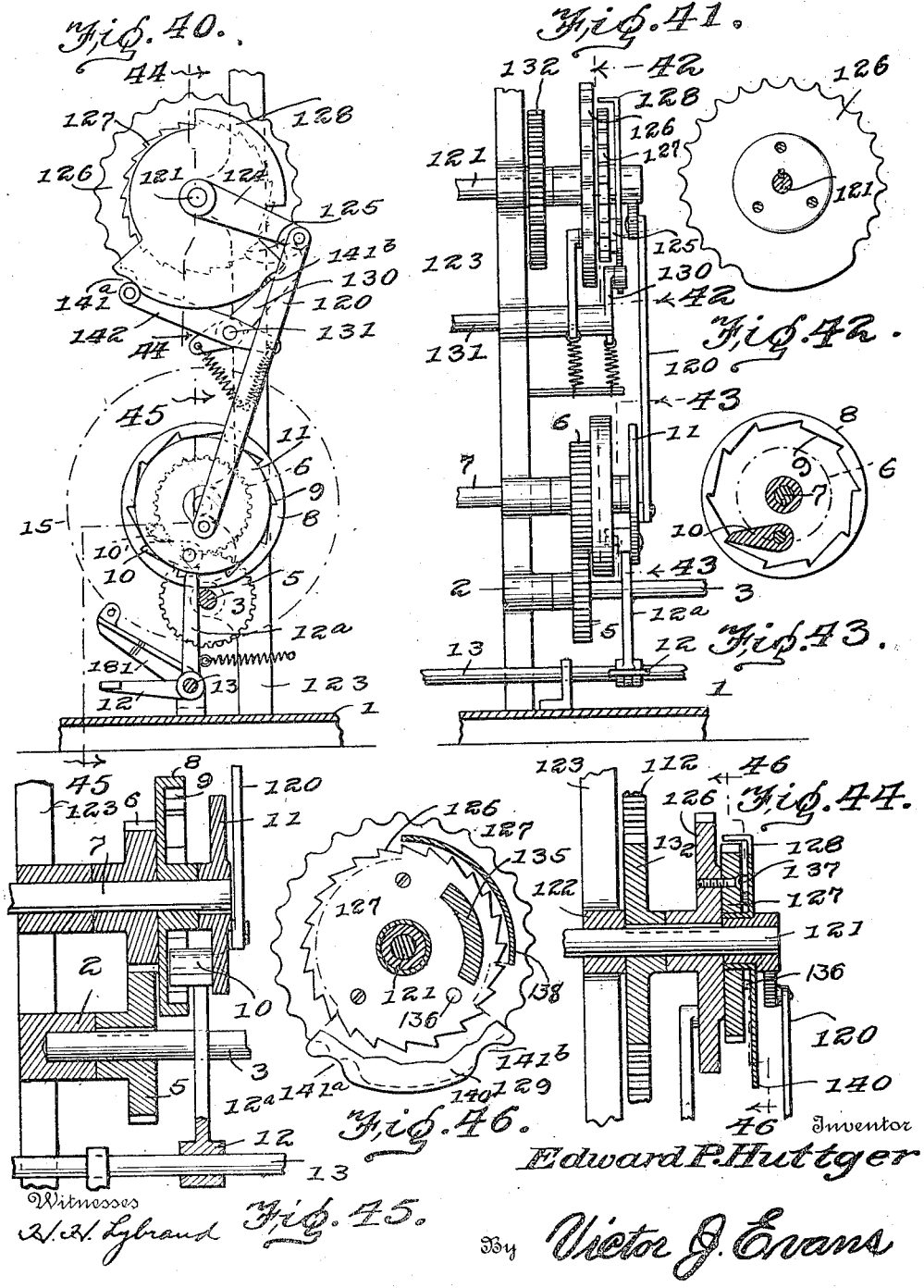

UNITED STATES PATENT OFFICE.

EDWARD P. HUTTGER, OF PHILADELPHIA, PENNSYLVANIA.

CIGAR-MANUFACTURING MACHINE.

1,289,785.                    Specification of Letters Patent.    Patented Dec. 31, 1918.

Application filed December 16, 1916.   Serial No. 137,415.

*To all whom it may concern:*

Be it known that I, EDWARD P. HUTTGER, a citizen of the United States, residing at Philadelphia, in the county of Philadelphia and State of Pennsylvania, have invented new and useful Improvements in Cigar-Manufacturing Machines, of which the following is a specification.

This invention relates to cigar manufacturing machinery, and has particular reference to an automatic machine for facilitating the production of cigar bunches or fillers.

The foremost object of the invention is to provide a machine wherein the element of manual labor hitherto involved in forming cigar bunches has been reduced to a minimum, in order that the bunches may be more economically and expeditiously manufactured in a practicable and thorough manner.

Another object resides in a machine of the above character which will mechanically produce a completed cigar bunch having all of the general attributes of a perfectly formed hand made bunch, and in one which will be applicable to form all grades of cigars.

Other objects will be in part obvious and in part pointed out hereinafter.

The invention accordingly consists in the features of construction, combination of elements and arrangement of parts which will be exemplified in the construction herein described and the scope of the application of which will be indicated in the following claims.

In the accompanying drawings, wherein is shown one of various possible embodiments of my invention—

Fig. 5 is a detail front elevation of the machine with parts to the rear omitted for clearness.

Fig. 6 is a detail rear elevation thereof.

Fig. 7 is a detail vertical sectional view, looking from the rear.

Fig. 8 is an enlarged vertical sectional view of the bunch rolling and transfer mechanism.

Fig. 9 is a detail side elevation of the brush operating means.

Fig. 10 is a detail side elevation of a portion of the brush operating mechanism, taken on the line 10—10 of Fig. 9.

Fig. 11 is a vertical sectional view on the line 11—11 of Fig. 2, disclosing the binder carrier and binder supply mechanism.

Fig. 12 is a similar vertical transverse section on the line 12—12 of Fig. 2.

Fig. 13 is a detail vertical section on the line 13—13 of Fig. 12.

Fig. 14 is a detail vertical section through the binder feed mechanism on line 14—14 of Fig. 15.

Fig. 15 is a detail side elevation thereof.

Fig. 16 is an enlarged sectional detail view of the lift for the binder feed mechanism.

Fig. 17 is a side elevation of the binder feed safety device as shown in section in Fig. 11.

Fig. 18 is a detail side elevation of the mold feeding table and drive mechanism, looking from the left side of the machine.

Fig. 19 is a vertical transverse section on the line 19—19 of Fig. 18.

Fig. 20 is a similar view on the line 20—20 of Fig. 18.

Fig. 21 is a horizontal sectional view on the line 21—21 of Figs. 1 and 22 disclosing a portion of the binder transfer cam and bunch rolling operating cam mechanism.

Fig. 22 is a side elevation of the binder rolling mechanism.

Fig. 23 is a vertical sectional view on the line 23—23 of Fig. 21, disclosing the binder transfer cam mechanism.

Fig. 24 is a vertical transverse section on the line 24—24 of Fig. 21.

Figures 25, 26:
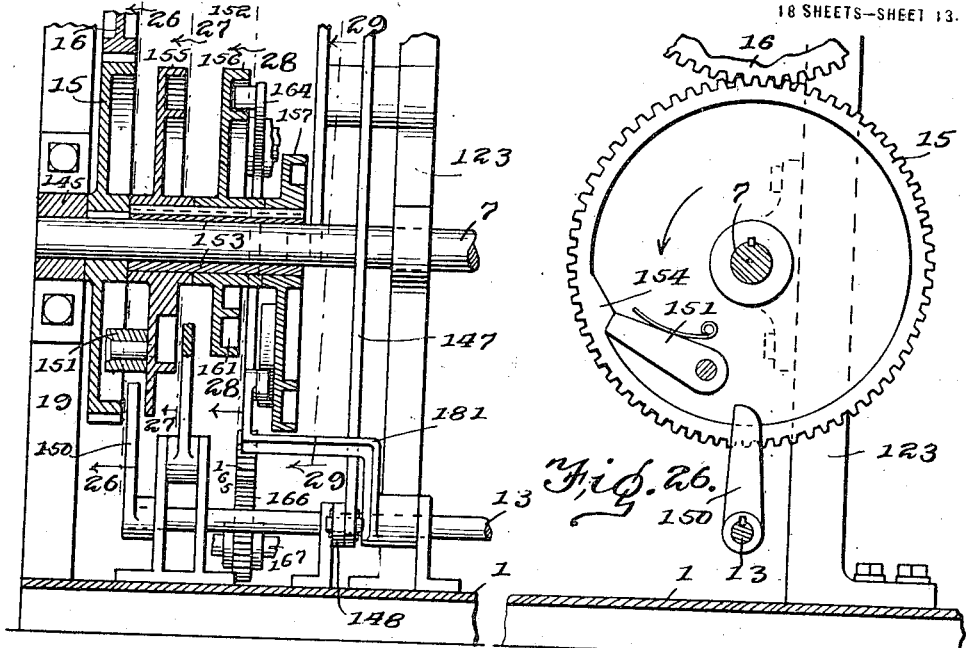
Fig. 25 is a vertical sectional view approximately on the line 25—25 of Fig. 3, of the mold transfer cam mechanism.
Figures 27, 28, 29:
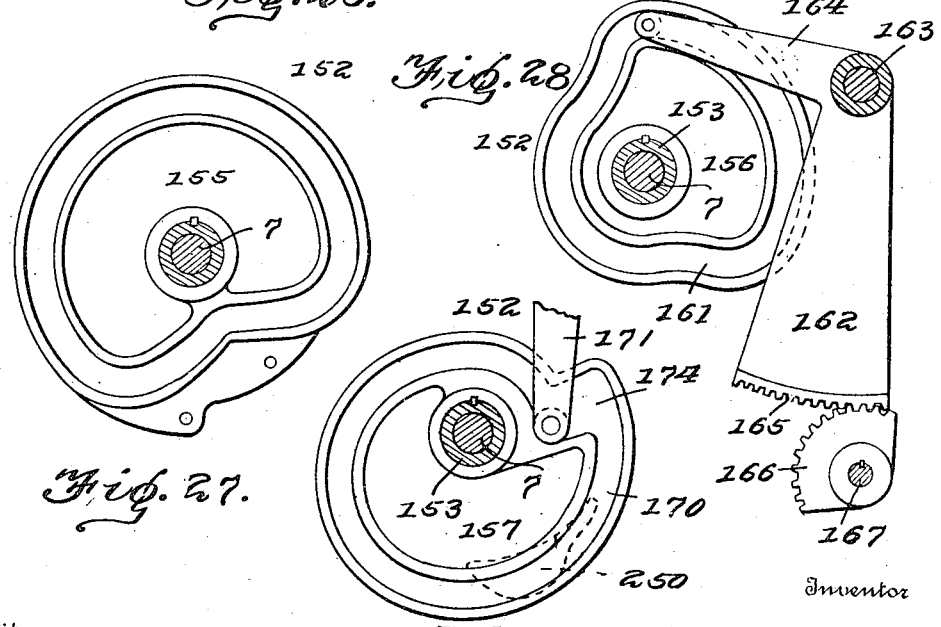

Figs. 26, 27, 28 and 29 are vertical transverse sections on the lines 26—26; 27—27; 28—28; and 29—29; respectively of Fig. 25.

Fig. 30 is a detail front elevation of the rack mechanism for transferring the mold.

Figure 3:
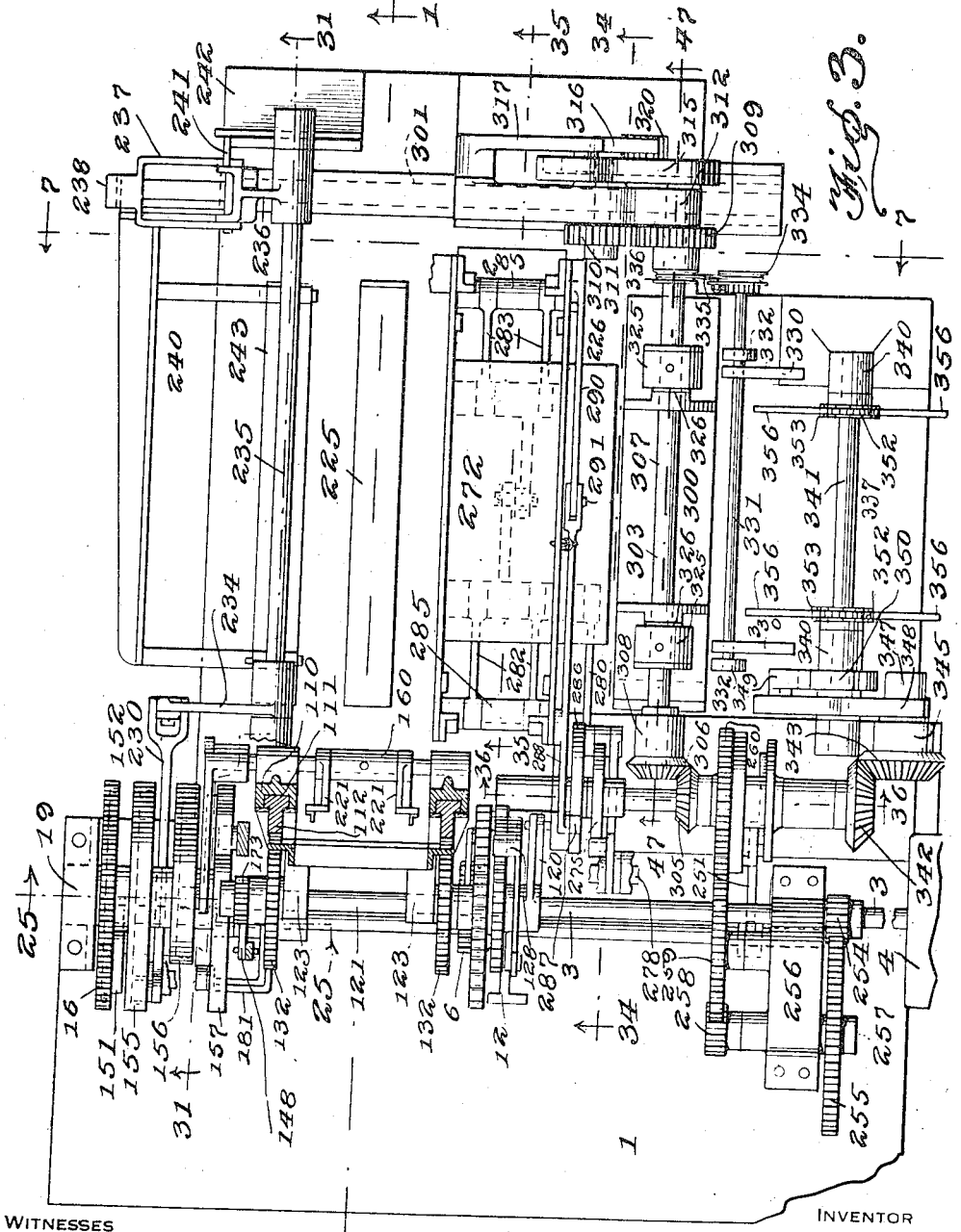
Fig. 3 is a detail horizontal sectional view with parts shown in Fig. 2 omitted.
Figure 4:
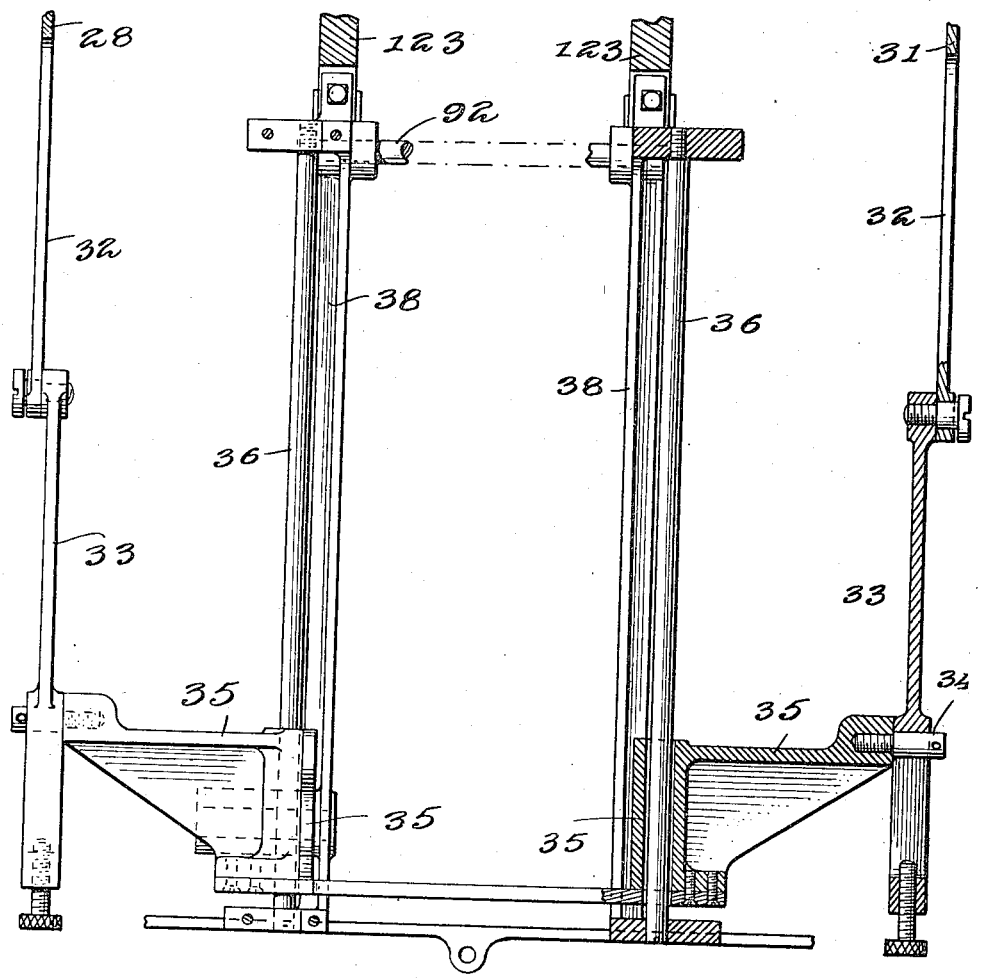
Fig. 4 is a similar view taken on the line 4—4 of Fig. 1.

Fig. 31 is a detail section on the line 31—31 of Fig. 3 disclosing the mold transfer horizontal pusher mechanism.

Fig. 32 is a detail vertical transverse section through the rack for operating the pusher mechanism and guide bracket for holding same.

Fig. 33 is a detail vertical section through one of the cushion devices of the horizontal mold pusher device.

Fig. 34 is a vertical longitudinal view of the cover feed mechanism taken on the line 34—34 of Fig. 3.

Fig. 35 is a similar view on the line 35—35 of Fig. 3.

Figure 36:
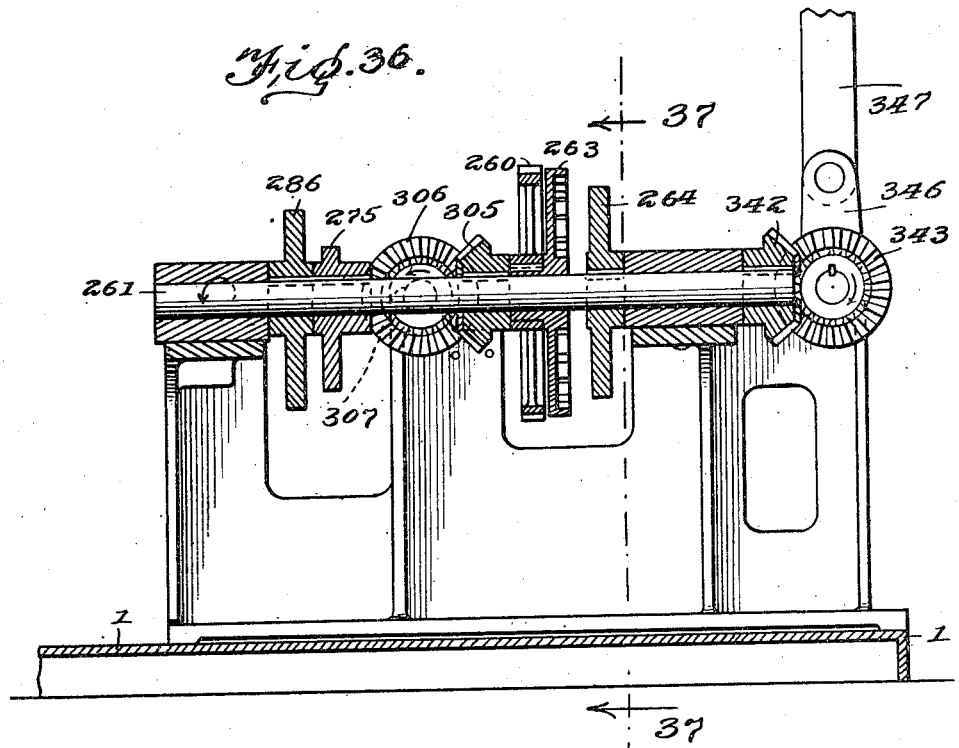

Fig. 36 is a detail vertical longitudinal section on the line 36—36 of Fig. 3, showing the shaft and drive actuating means; the cover feed; cover press and elevation driving means.

Figure 37:
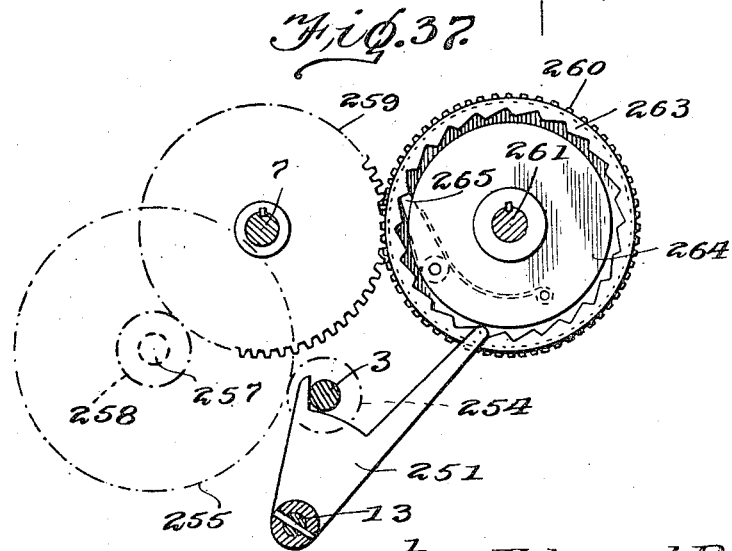

Fig. 37 is a detail vertical transverse section on the line 37—37 of Fig. 36.

Fig. 38 is a detail plan view of the motor and drive gearing for the bunch making machine.

Fig. 39 is an end view thereof.

Fig. 40 is a detail side elevation of the clutch mechanism employed in the present machine, taken on the line 40—40 of Fig. 5.

Fig. 41 is a front elevation of the mechanism disclosed in Fig. 40.

Fig. 42 is a detail vertical section on the line 42—42 of Fig. 41.

Fig. 43 is a detail vertical section on the line 43—43 of Fig. 41.

Fig. 44 is a detail vertical longitudinal section on the line 44—44 of Fig. 40.

Fig. 45 is a detail vertical longitudinal section on the line 45—45 of Fig. 40.

Fig. 46 is a detail vertical section on the line 46—46 of Fig. 44.

Fig. 47 is a vertical longitudinal section through the cover press.

Similar characters of reference denote corresponding parts throughout the several views of the drawings.

As a foreword to the general description of the present invention, it is advisable to state, for the sake of clearness, that the machine illustrated does not contemplate the initial assembling of tobacco leaves into bunch formation, but on the other hand has placed this function upon the operator of the machine, who must necessarily be a skilled bunch maker. The reason for this feature is that after extensive experiments it has been determined that by reason of the fact that the usual cigar bunch is generally composed of several blends or grades of tobacco, it is mechanically impossible to provide adequate and reliable mechanism to select the several blends, thence to assemble the same, and finally to form the selected, and weighed, tobacco into an embryo bunch, so that it will be in a proper condition to be subjected to the action of a mold. Various devices for accomplishing this action have been devised, but their scope of utility has been limited to the lower grade of cigars and cannot be successfully employed in the production of the medium and higher grades.

Realizing the facts set forth in the above statement, I have provided a machine wherein is eliminated the means for assembling by mechanical devices, the leaves of a cigar bunch or filler, and have provided a practicable machine for decreasing the cost of producing bunches, this being accomplished by embodying means to expedite their manufacture and by obliterating the services, to a large extent, of unskilled labor.

It will be obvious as the description proceeds that the present invention will only require the services of a single cigar maker, and that the latter will be at all times, in that part of his work, which requires practical skill and training, and that his attention will not be detracted by being forced to perform duties, which do not require skill. The invention, also, provides means for systematizing the manufacture of cigar bunches, whereby the same may be accomplished in an efficient and expeditious manner, and when completed will have the same characteristics as a hand-made bunch, thus permitting the machine to be employed in the manufacture of the better grades of cigars, as well as the cheaper grades. The present invention, as stated before, is equally applicable to all grades of cigars, and in this respect it differentiates from the machines hitherto developed in the art, that is, while the invention eliminates certain impracticable parts of the machines hitherto developed, it does not stop in its utility at this feature, but provides further improved features of construction which facilitate the manufacture of cigar bunches.

Referring more particularly to the mechanism employed in the preferred embodiment of this invention and which has been illustrated in the accompanying drawings, the numeral 1 designates the base of the machine, the latter being of cast metal construction and suitably formed to support directly or indirectly the various elements of the machine. Mounted upon the base are bearings 2, employed to support for rotation a driven shaft 3, said shaft being rotated by any suitable means 4, such as an electrically driven motor, pulley wheel or an equivalent, the shaft 3 being continuously rotated by means of the motor 4 while the machine is being operated. Revoluble with the shaft 3 is a spur gear 5 operable to mesh with a similar gear 6, loosely mounted upon a cam shaft 7. Rotatable with the gear 6 and free upon the shaft 7 is a clutch ratchet 8, having internal ratchet teeth 9, formed therein, and operable to engage with the ratchet teeth is a spring pressed pawl 10, pivotally secured to a pawl plate 11, the latter being keyed or otherwise secured to the shaft 7 so as to rotate therewith. When the machine is idle, a foot release pedal 12, loose upon a journaled shaft 13, at the upper portion thereof is so arranged as to contact with the lower surface of the pawl 10, whereby the latter will be lifted out of engagement with the teeth of the ratchet 8, in order to prevent the plate 11 from revolving. However, when the operator of the machine desires to throw the latter into active service, the pedal 12 is rocked, by the operator's foot, so that the arm 12$^a$ of said pedal will be oscillated to a position independent of the pawl 10, thus permitting said pawl to be forced into engagement with the ratchet teeth 9 by the action of the pawl spring 10'. This operation results in directly coupling the plate 11 to the rotatable ratchet 8 and shaft 7, whereby the latter elements will revolve in unison.

Secured to the opposite extremity of the shaft 7 is a gear 15, which is rotatable when the plate 11 and the shaft 7 are revolving in unison. Meshing with the gear 15 is a similar gear 16 which is loose upon a stud shaft 17, secured in a bearing 18 formed in a bracket 19, the latter also being employed to support the inner extremity of the shaft 7.
The shaft 17 has rotatably mounted upon the outer extremity thereof an apron operating cam 20, which is adapted to be thrown into a state of rotation upon the rotation of the gear 16. Formed in the cam is a cam guideway 21, in which is inserted a roller 22, rotatable upon one extremity of a bell crank lever 23, the latter being pivoted, as at 24, upon a frame-bar 25, the lever 23 being employed to operate a bunch rolling mechanism to be hereinafter described. An arm 26 of the lever 23 is pivotally connected with one extremity of a link 27, which is employed to transmit motion from the lever 23 to a second bell-crank lever 28, rigidly secured to a horizontally extending shaft 29. The shaft 29 is rotatably mounted in bearings 30 provided in frame bars extending upwardly from, and secured to, the base 1. A lever 31 is secured to the opposite end of the shaft 29 and operates in synchronism with the bell-crank 28.

The lower extremities of the levers 28 and 31 are bent forwardly, as at 32, and the extremities thereof are pivotally connected with the rear ends of parallel extending links 33. The forward portion of the links 33 are slotted for the reception of pins or studs 34 mounted upon reciprocating brackets 35, forming a part of the bunch receiving and rolling mechanism to be hereinafter set forth. The brackets 35 are slidably mounted upon guide rods 36, which are located adjacent to a rolling table 37, the latter being supported by suitable frame work construction 38, extending upwardly from the base 1. Thus it will be apparent that the rotation of the cam 20 will result in rocking the lever 23, which in turn will impart movement to the shaft 29 consequently rocking the levers 28 and 31, and due to their connection with the links 33, a reciprocating movement will be transmitted to the brackets 35. The slots in the links 33 are provided so that the initial rearward movement of the brackets 35 will not impart a similar movement to the links, for a reason to be presently set forth.

Journaled between the bracket 35 and disposed immediately above the table 37 is a roller 40, the latter being situated, when the brackets are in their retracted or forward position, at a position slightly in advance of a bunch receiving depression 41 provided in the table 37. A flexible apron 42 is secured adjacent to the opposite ends of the table and is trained over the roller 40, the apron being sufficiently flexible or full to permit the same to lie within the depression 41.

In the initial operation of the machine, the cigar maker roughly assembles the filler of a cigar by hand, and thus places the same upon the portion of the apron 42 lying within the depression 41, in order that the bunch may be subjected to the action of the rolling mechanism. The bunch is then bound within the apron, by the forward movement of the brackets 35, which is accomplished manually and is limited by the extent of the slots within the links 33. This initial movement of the bracket will result in moving the roller 40 over the depression 41, so that the bunch lying within the depression will be caught in a loop 43 thus formed in the apron. After the formation of the loop 43, the mechanical means, previously described, are thrown into active operation to complete the forward movement of the loop 43, whereby the bunch carried by said loop will be rolled into assembled, compact formation, as will be clearly understood.

While the bunch is being operated on by the rolling mechanism above described, there is provided coöperative mechanism for supplying a binder thereto. This binder supplying mechanism consists of a cam 45 rotatable with the gear 16 and having a cam guideway therein for the reception of a roller journaled on one end of a bell crank lever 46, which is pivoted upon the frame bar 25 at the point 24. The upwardly extending arm of the lever 46 is pivotally connected with an extremity of an oscillatory horizontally disposed throw arm 47, which is pivoted as at 48 to a frame bar. The forward extremity of the arm 47 is pivotally connected by a link 49 to a suction operated binder carrier 50, the latter being adapted to operate in unison with the arm 47 and having its movement governed by the rotation of the cam 45, as will be obvious.

The carrier 50 is supported on a plane slightly above the table 37 by means of a telescopic rod 51, which is fixed to one end of a rocking lever 52 pivoted as at 53 upon the frame construction. The lower extremity of the lever 52 is provided with an offset 54, which is operable to engage the face of the cam 45, whereby, at predetermined intervals the lever 52 will be oscillated by said cam, so as to raise or lower the binder carrier 50. Thus it will be apparent that the binder carrier is operable to move both in horizontal or vertical planes, in order that the same may conduct a binder leaf to the apron, in a manner to be hereinafter fully disclosed.

The carrier 50 embodies a hollow casing having a flat perforated bottom 55, and the casing is further provided with a superimposed valve chamber 56 for the reception of a rotary valve 57, the latter being operable to regulate the air suction imparted to the carrier. The valve 57 may be of any suitable construction, but in this instance the same consists of a tubular section having an opening 58 formed therein. The opening 58 is operable to register at certain times with an air exhaust opening 59 formed in the chamber 56, so that the air within the interior of the casing may be withdrawn therefrom, by the action of a suitable suction device (not shown). However, when the opening 58 of the valve fails to register with the exhaust 59, the binder carrier will be impervious to the action of the suction device.

Positioned immediately below the binder carrier 50, when the latter is in its retracted position, is a binder supply 65, consisting of a casing 66 suitably secured to the frame work or to any other convenient member. The casing 66 is substantially U shaped in construction, provided with an open top, and is slightly larger than the bottom 55 of the binder carrier, in order to receive the latter therein at predetermined intervals. The casing 66 is designed to receive a quantity, preferably one hundred, of cut binder leaves, which are adapted to be singly associated with the binder carrier so as to be conducted to the bunch rolling mechanism. The binder leaves are adapted to be positioned upon a vertically movable plate 67, which is operable to move upwardly a slight distance after a binder leaf has been connected with the binder carrier, this being done in order to maintain the same relative distance between the bottom 55 of the binder carrier and the upper binder leaf carried by the plate 67, thus insuring a flat and unwrinkled association of a binder leaf with the member 55. The means for elevating the plate 67 will be disclosed in the following description, when certain members for effecting its operation have been more fully described.

In the initial operation of the binder carrier, the lever 52 is operated by the cam 45 to permit the carrier to drop vertically to a position contiguous to the leaves of the binder supply, in order that a leaf or what will be hereinafter termed a binder may be connected therewith. After this operation has been effected, the lever 52 will be again operated to elevate the carrier to its normal position, the binder being connected with the member 55 by the vacuum within the binder carrier, as will be clearly understood. Subsequent to the latter operation, the throw arm 47 is oscillated, by means of its connection with the cam 45, and will in turn impart a horizontal movement to the carrier 50, moving the latter toward the bunch rolling mechanism.

Due to the formation of the guideway of the cam 45, the carrier 47 will be moved forwardly toward the rolling mechanism by stages, this being accomplished in order that the carrier will stop when the same is immediately over an auxiliary suction device 70. The device 70 is employed to prevent the accumulation of two or more binders upon the bottom 55 of the carrier, in other words, the device 70 is utilized to insure the delivery of but one binder to the rolling mechanism. It frequently occurs that defects, such as openings or tears, are found in the binders, so that when the binder carrier 50 is associated with a downward binder its action will be imparted to an underlying binder, with the result that two or possibly more binders would be delivered to the rolling mechanism when only one is required.

In order to obviate the above the auxiliary suction device 70 is provided, and the same consists of a hollow casing having a perforated top 71, the interior of the casing being connected with a suction device (not shown) of lesser power than that used to operate the binder carrier, this construction being necessary in order that the suction created by the device 70 will not be strong enough to disconnect one binder from the carrier. The suction created by the device 70 is, therefore, of only sufficient strength to loosen superfluous binders from the carrier 50, so that when the latter arrives at a position contiguous to the rolling mechanism it will carry but a single binder. The binders thus deposited upon the top 71 will cling to the same until the binder carrier returns, when the suction of the latter will be sufficient to disconnect the binder from the device 70, so that it will cling to the binder carrier, whereby it will be in readiness to be deposited upon the rolling mechanism when the carrier is again reciprocated.

After stopping momentarily at the auxiliary suction device 70, the carrier again resumes its forward movement toward the rolling mechanism, and will thus be carrying but a single binder. It will be well to state at this juncture, that the auxiliary suction device 70 is only called into operation at infrequent intervals, and that it is more of a precautionary device than being absolutely essential in governing the carrying of a binder. After leaving the device 70, mechanism is provided for governing the operation of the valve 57, so that the instant the carrier arrives at a point above the rolling mechanism the binder carried thereby will be discharged upon the latter. To this end the valve 57 is provided with a spring pressed arm 72, operable to retain the valve in a position whereby the suction device may be used to associate a binder leaf with the carrier. The arm 72 is adapted to contact with a fixed bracket 73 disposed contiguously to the rolling mechanism when the carrier is advanced from the device 70, in order that the valve 57 will be rotated to shut off the action of the carrier suction device. This action results in admitting air into the interior of the carrier, this being facilitated by the partial vacuum created by the suction device. Thus the binder adhering to the carrier will be forced away from the latter by the inrush of air into the carrier chamber and will be deposited upon the rolling mechanism. Immediately after the latter operation takes place, the carrier will be retracted to a position above the binder supply so as to be out of the way of the rolling mechanism by the time the latter is thrown into active operation. The return of the carrier results in again operating the valve 57 so that a suction device of the carrier will be in condition to pick up a fresh binder.

When a binder is deposited upon the table 37 by the action of the carrier 47, one edge of the binder will lie within the depression 41 so that the same will be in position to be readily associated with a bunch carried by the apron 42. As has been stated before after the operator has placed a bunch upon the apron 42, he will move the roller 40 rearwardly to form the loop 43 which results in connecting an edge of the binder with the bunch.

Figure 1:
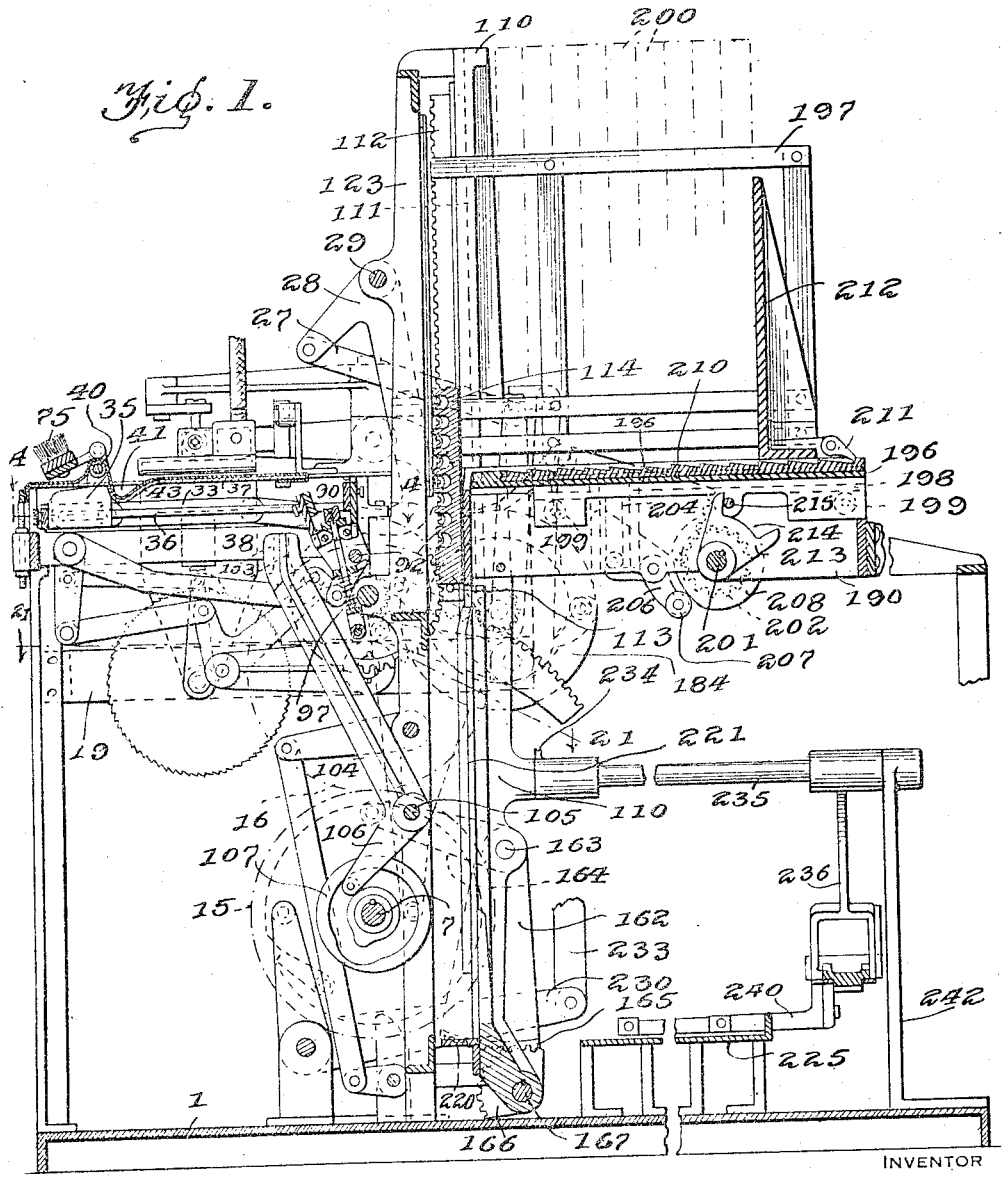
Figure 1 is a vertical sectional view of a bunch making machine comprising the present invention.
Figure 2:
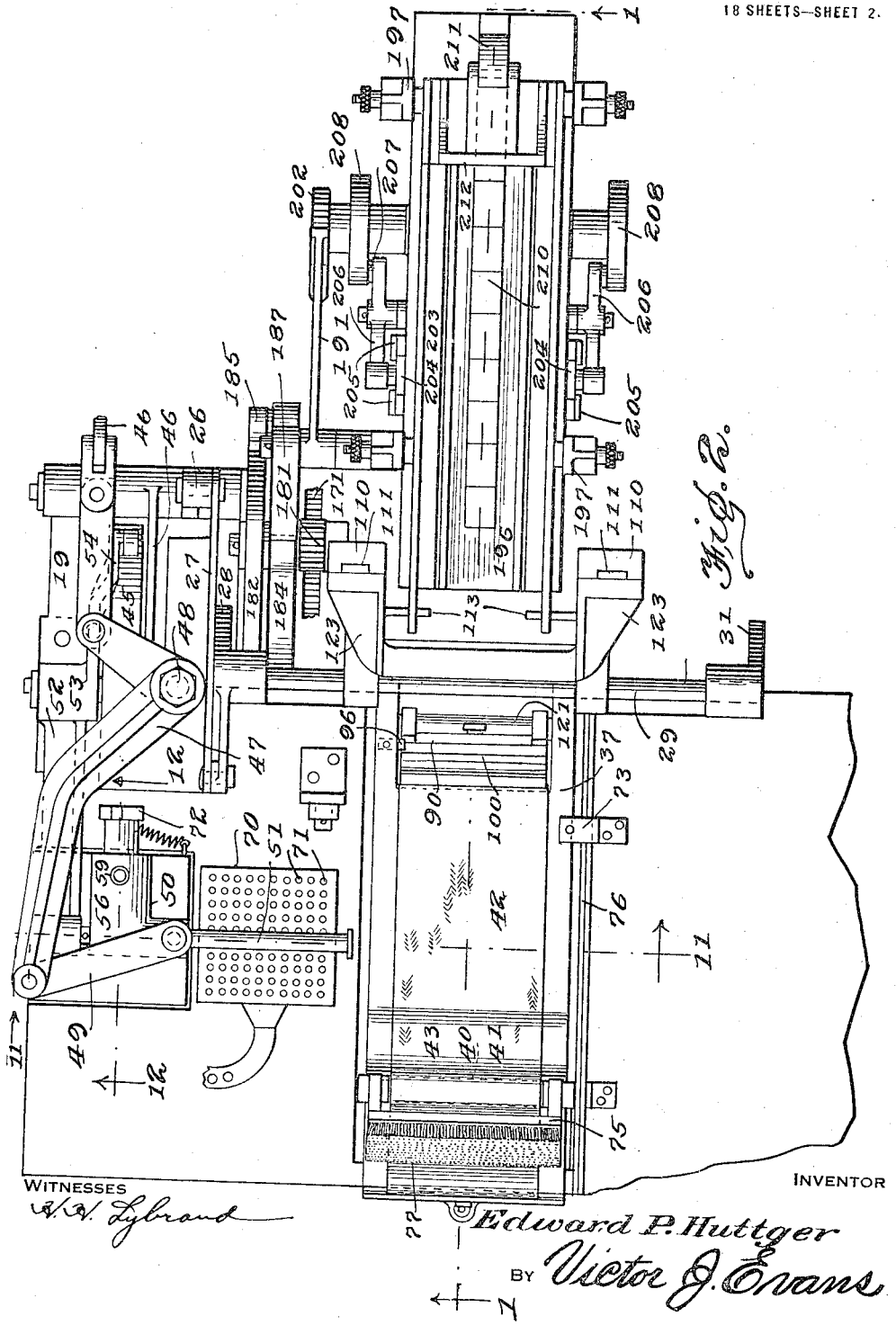
Fig. 2 is a fragmentary top plan view thereof.

In order to insure a smooth wrapping of the binder about the loop conducted bunch, the brackets 35 have pivotally mounted thereon a brush member 75 which, when the brackets are retracted, is adapted to be oscillated to the inactive position disclosed in Fig. 1, whereby the bunch may be readily inserted into the depression 41. The pivot shaft of the brush member has a pinion 75ª which is engaged by the teeth of a segment 75ᵇ which is pivotally mounted as at 75ᶜ and which is provided with a revolubly mounted tappet roller 75ᵈ. Fixed stops are arranged at the ends of the path of movement of said tappet roller 75ᵈ. The parts 75ª, 75ᵇ, 75ᶜ and 75ᵈ are hereinafter referred to as cam mechanism 76. When the brackets 35 are moved forwardly or when advanced, the brush 75 will be oscillated by cam and rack mechanism 76 to bring the bristles 77 of the brush into direct contact with the binder positioned upon the table 37. Thus while the brackets are being advanced the brush 75 will constantly engage the binder deposited upon said table, so that the latter will be stretched by the action of the brush and prevented from wrinkling or becoming displaced while the same is being associated with a binder carried by the apron 42. When the brackets are retracted, the brush will revolve to its inactive position due to the action of the cam mechanism 76. Thus it will be seen that by reason of the mechanism described, the present invention provides means for receiving a manually assembled filler or bunch, and then provides automatic mechanism for completing the rolling of said bunch and to wrap a binder about the same. After this operation has been fulfilled, the invention also embodies automatically operating mechanism to transfer the rolled bunch from the rolling mechanism to bunch shaping and finishing mechanism, to be hereinafter fully described.

In order to transfer the bunches finished by the rolling mechanism to the shaping mechanism, there is mounted in the guideway of the cam 20 a roller 80, fixed to one extremity of a bell-crank lever 81. The lever 81 is pivotally mounted upon the fixed stud 83 on the frame bar 25 and the opposite extremity of said lever is pivotally connected with a link 84, the latter being operable to connect the lever 81 with a crank arm 85 depending from and secured to a horizontal shaft 86. Thus the movement of the cam 20 will oscillate the lever 81 which, in turn, will partially rotate the shaft 86. Secured to the shaft 86 is a rocking arm 87 which extends inwardly and is pivotally connected as at 88 to a movable link 89 pivoted to a transferring element 90.

The preferred construction of the element 90 has been fully set forth in Letters Patent of the United States, No. 1,263,673, granted to me April 23, 1918, however, a practical method of operating the transferring element in conjunction with the present invention has been illustrated in the accompanying drawings. The element 90 consists, in this instance, of a lower frame 91, which is pivoted as at 92 to the frame bars 38. Pivotally mounted upon the upper portions of the frame 91 are rotatable jaw members 93, which are provided with removable bunch receiving forms 94, the forms being removable in order that cigars of various sizes or shapes may be received thereby, as each form is designed to receive a bunch which will have a distinctive outline. Jaw members 93 are provided with intermeshing tooth segments 95, which are operable to rotate the jaw members in synchronism. When the transferring element 90 is in the substantially vertical position disclosed in Fig. 1, the jaw members 93 will be opened or spread apart to receive a bunch discharged by the rolling mechanism, this being accomplished by permitting one of the jaw members to engage with a fixed stud 96 provided adjacent to the table 37 so that the same will be forced apart. However, when the element 90 is free of the influence of the fixed stud 96, the jaws will be forced together by the action of a spring 97, so that a bunch carried by the transferring element will be securely positioned within the latter and prevented from accidentally falling out. The element 90 is rocked from its substantially vertical position to an approximately horizontal position or vice versa, by the rotation of the cam 20 and its associated chain of levers, as will be clearly understood.

Interposed between the jaw members is a movable plunger 100 which is supported in bearings provided in the frame 91. When the transferring element 90 is in its vertical position the plunger 100 will receive the cigar bunch, and when the element 90 is rotated to a horizontal position said plunger is employed to eject the bunch carried by the element into a bunch shaping mechanism. This operation is effected by providing the lower extremity of the plunger with a roller 102, which is operable, when the element 90 is horizontally disposed, to engage with shoulders 103 provided on an ejecting arm 104. The arm 104 is pivotally mounted as at 105 and is provided with a cam engaging extremity 106, which is operable in the guideway of the cam 107 fixed to the shaft 7. Thus when the roller 102 is engaged with the shoulders 103, the cam 107 will oscillate the arm 104 in a direction to press the plunger 100 outwardly, in order that the bunch carried by the jaws 93 will be ejected thereby. The continued rotation of the cam 107 will return the arm 104 to its normal position and, likewise, the continued rotation of the cam 20 will return the transferring element to a substantially vertical position for the reception of a new bunch.

The bunch shaping mechanism preferably consists of fixed uprights 110, mounted upon the base 1. Guide grooves 111 are provided in the uprights and have slidably mounted therein vertically operable rack bars 112, the latter being disposed in parallel relation and adapted to be operated in unison. The rack bars 112 are intermittently moved upon each successive operation of the transferring element 90 and the means for effecting the operation of said bars will be set forth hereinafter. Horizontally extending alining studs 113 protrude inwardly from the rack bars and are utilized to support a single bunch receiving mold 114 thereon, whereby said mold will operate in conjunction with the movable rack bars, as will be obvious.

The molds 114 are of the usual standard formation, consisting of a rectilinear body having a plurality of vertically alining bunch receiving cavities 115 formed therein. The cavities 115 may be of any desired shape or size in order that bunches of any desired design may be formed. When the mold 114 is initially placed upon the studs 113 the lowermost cavity thereof will be in position to receive a bunch from the transferring element 90; this action being effected by the operation of the plunger 100, which forces the bunch from the mold into the cavity. After this action has been accomplished, the cavity immediately adjacent to the bunch filled cavity will be brought into alinement with the transferring device to receive a bunch carried by the latter upon its subsequent operation, this action being accomplished by the lowering of the mold 114 a predetermined distance. The above action is successively carried out until the mold 114 has all the cavities thereof filled with bunches, whereupon the mold will be discharged from coöperation with the transferring element and an empty mold will be inserted in lieu thereof.

In order to effect the movement of the mold 114, so that the various cavities thereof may be brought into registration with the transferring element 90, the pawl plate 11 has connected therewith a link 120, which is employed to transmit motion from plate 11 to a feed shaft 121, superposed above shaft 7 and rotatably mounted in bearings 122 formed in stationary frame bars 123, located contiguous to the uprights 110. Loosely mounted upon the outer extremity of the shaft 121 is a pawl carrying arm 124, which has the free extremity thereof pivotally connected with the upper pin of the link 120, so that a single movement will be imparted to the arm 124 when the plate 11 is in a state of rotation. As previously described, the plate 11 has its rotation controlled by the foot pedal 12. Also, pivoted to the free end of the arm 124 is a spring pressed feed pawl 125, the latter being adapted to engage with ratchet teeth 126 provided on a feed ratchet 127 rotatable with the shaft 121. It will be evident that when the plate 11 is rotated a complete cycle, that the link 124 will be oscillated sufficiently to revolve the feed ratchet 127 a distance corresponding to the circumferential length of one of the teeth 126. This operation enables the pawl 125 to succestively engage with each of the teeth 126, and will therefore accordingly rotate the ratchet 127 by steps or degrees, thus imparting an intermittent rotary movement to the shaft 121. A detent disk 128 is fixed to the shaft 121 and to the ratchet 127, and is provided with a corrugated periphery 129, which coöperates with a spring pressed detent arm 130, loosely mounted upon a cam operating shaft 131, the arm 130 being employed to retain the feed shaft 121 relatively stationary when the latter is not in a state of rotation. Keyed or otherwise secured to the shaft 121 are feed gears 132, which are formed to mesh with the teeth of the rack bars 112, so that the intermittent movement of the feed shaft 121 will be directly transmitted to said rack bars. The rotation of the shaft 121 will be so timed that the movement of the rack bars and the mold carried thereby will take place when the transferring element 90 is out of registration with the cavities of the mold, as will be readily understood.
In order to effect the removal of a bunch filled mold from the rack bars 112 and to restore the latter to an elevated position to receive an empty mold, there is provided a simple and yet efficient mechanism for automatically performing the same. This mechanism in its preferred embodiment consists of a lug 135 provided on the outer face of the ratchet 127, which is operable to engage with the pin 136 carried by a feed pawl releasing plate 137, the latter being free to rotate with respect to the shaft 121. The plate 137 is formed with an offset projection 138, which is operable to overlap the teeth 126 of the feed ratchet, so that after the ratchet 127 has been revolved to a predetermined point, necessary to lower the mold 114 to its lowermost position, one extremity of the lug 135 will engage with the pin 136, in order to revolve the plate 137 in unison with the ratchet 127. This movement on part of the plate 137 will result in revolving the projection 138 until it engages with the feed pawl 125, to prevent the latter from engaging with the ratchet teeth 126, thus preventing the movement of the link 120 from being transmitted to the feed shaft 121, for reasons which will hereinafter appear. The plate 137 is also provided with an extension 140, having notches 141 formed at spaced intervals in the periphery thereof, and operable to engage with one or the other of the notches 131 is a spring pressed lever 142, which is keyed to the shaft 131. Normally the lever 142 rests within the notch 141ª of the extension 140, but when said plate 137 is revolved, through the medium of the lug 135 and pin 136, the lever 142 will be forced out of engagement with the notch 141ª and will ride upon the periphery of the extension 140, thus partially rotating the cam shaft 131, by reason of the fixed connection between the lever 142 and the shaft 131. The notch 141ᵇ is employed to restore the shaft 131 to its normal position and to hold the parts associated therewith against undue movement prior to the returning of the lever 142 to the notch 141ª. Means are provided, as will appear, for reversing the direction of movement of the shaft 121. This permits the opposite extremity of the lug 135 to engage the pin 136, after the lug has made substantially a complete rotation, so that the plate 137 will be restored to its initial position.

The shaft 131 is rotatably mounted in bearings 145 provided on the frame bars 123, and has mounted on the inner extremity thereof, a crank arm 146, which is connected by means of a link 147 with a second crank arm 148, keyed to the shaft 13, so that the movement of the shaft 131 will be directly transmitted to the shaft 13. It will be noted that the relative dimensions of the crank arms 146 and 147 will permit the shaft 13 to be quickly actuated upon the relatively slight movement of the shaft 131. Secured to the inner extremity of the shaft 13 is a clutch arm 150, which normally engages with a spring pressed pawl 151, fixed to the inner face of one of a series of synchronously rotatable cam elements 152, the latter being keyed to a common sleeve 153 loosely mounted upon one extremity of the shaft 7 and located adjacent to the gear 15. The clutch arm 150 normally engages with the under surface of the pawl 151, so that the latter will be lifted out of the path of movement of an internal ratchet tooth 154 provided on the gear 15. However, when the shaft 131 is revolved, the clutch arm 150 will be rocked out of engagement with the pawl 151 so that the latter will contact with the tooth 154 of the driven gear 15, whereby movement will be imparted to the cam elements 152. The cam elements 152 preferably consist of synchronously operating cams 155, 156 and 157, which are rotatable by the coöperation of the pawl 151 with the driven gear 15, as will be clearly understood.

It will be noted that the mold 114, is fed downwardly, in order that the cavities thereof will aline at proper intervals with the transferring element 90 when the latter is in the horizontal position, therefore, after the mold has been filled with bunches it will be necessary to remove the same from the rack bars 112 so that an empty mold may be inserted in place thereof. This action is accomplished by providing an oscillating frame 160 which is so positioned as to receive the mold 114 when the latter reaches its lowermost extent of movement. When the mold is deposited upon the frame 160, the cam 157 will be in a state of operation so that the guide way 161 thereof will oscillate a segment 162, the latter being pivoted as at 163 upon one of the uprights 110. The segment 162 is provided with an arm 164 operable within the guideway 161 of the cam 156 whereby the rotation of said cam will oscillate the segment. Meshing with the teeth 165 of the segment is a similar element 166 which is keyed to a shaft 167, rotatable in suitable fixed bearing. The oscillating frame 160 is keyed to the shaft 167 so that when the latter is rotated by the action of the cam 156, the oscillating frame 160 will be rocked rearwardly carrying the mold deposited thereon, thus removing a bunch filled mold from engagement with the studs 113 of the rack bars 112, in order that the latter may return to an elevated position for the reception of an empty mold.

In order to return the rack bars 112 to an elevated position, the cam 157 is formed with a guide groove 170 in which is positioned one extremity of the feed shaft operating segment 171, the latter being pivoted as at 172 upon one of the frame bars 123. Meshing with the teeth of the segment 171 is a pinion 173 secured to the feed shaft 121. When the shaft 121 is revolving to feed the rack bars 112 downwardly, the pinion 173 will rock the segment 171, however, this movement will not interfer with the normal operation of the cam 137, as the latter is provided with an enlarged slot 174, offset from its guide groove 170, so that the lower arm of the segment 171 will be positioned within the guide groove 170 when the cam 157 begins to rotate. Attention is called to the fact that the cam 157 is not thrown into operation until after a bunch filled mold has been discharged from the rack bars 112. This construction permits the segment 171 to revolve inactively when the shaft 121 is operating to feed a mold downwardly. However, when the latter is discharged from the rack bars 112, the cam 157 is rotated so that the segment 171 will be oscillated to its initial position, and this latter operation of the segment 171 results in reversing the normal rotation of the shaft 121 so that the rack bars 112 will be elevated, as will be clearly understood. The reverse rotation of the shaft 121 is permitted by reason of the fact that the feed ratchet 127 is free of the influence of the feed pawl 125, the latter being held inactive by the action of the projection 138 of the plate 137. When the cam 157 completes its cycle of operation, the lower extremity of the segment 171 will be positioned within the slot 174 of said cam, so that it may be free to oscillate when the shaft 121 is controlling the downward movement of the mold.

The present invention also includes mechanism for automatically depositing an empty mold upon the rack bars 112 when the latter are restored to their elevated positions. This mechanism in its preferred form consists of a short shaft member 180, secured upon bearings provided in the uprights 110. Mounted upon the shaft is a pinion 181, which is adapted to mesh with the teeth of the segment 171, so that the movement of said segment will rotate the pinion 181. Rotatable with the pinion 181 is a drive ratchet 182, having ratchet teeth 183 formed on its periphery. The cam 184 is loosely mounted upon the shaft 180 and has the outer face thereof provided with a spring pressed pawl 185, the latter being adapted to engage with the teeth 183 so that the return of the segment 171 will result in the rotation of the cam 184. It will be seen that when the segment 171 is inactively advancing, motion will not be transmitted to the cam 184, inasmuch as the pawl 185 will merely ride over the teeth of the ratchet 182. The periphery of the cam 184 is provided with ratchet teeth 186 which are adapted to coöperate with the gravity pawl 187, suitably fixed to the machine, the pawl being utilized to prevent undue rotation of the cam 184 when the segment 171 is advancing, as will be obvious.

Pivoted to a mold supporting frame 190 is a mold feed segment 191, the same being provided with an integral offset arm 192, which is operable to engage within a groove 193, provided in the cam 184, whereby the rotation of the cam will result in the oscillation of the segment 191.

The mold supporting frame 190 embodies a base 195, a movable table 196 and a superimposed guide frame 197. The table 196 is provided with depending flanges 198 which are supported upon rollers 199 fixed to the base 195, this construction permitting the table 196 to move freely with respect to the stationary base 195. Normally supported upon the table 196 are vertically positioned molds 200, the latter being positioned with their lower edges in contact with the table 196 and arranged side by side, the guide frame 197 being utilized to insure this feature. Journaled within the base 195 is a shaft 201, having one extremity thereof provided with a fixed pinion 202, the latter being adapted to mesh with the teeth of the segment 191, whereby upon movement of said segment, the shaft 201 will be revolved.

In order that the table 196 may be moved forwardly at predetermined intervals to discharge a mold carried thereby upon the studs of the rack bars 112, there are provided parallel mold supporting bars 203, the latter being disposed upon opposite sides of the table 196. The bars 203 are provided with downwardly extending projections 204, operable within guides 205 formed on the base 196. The lower extremities of the projections 204 rest upon the ends of levers 206 pivoted to opposite sides of the base 195. The opposite extremities of the levers 206 are provided with rollers 207, which are adapted to engage with cams 208 keyed to the shaft 201. Thus when the shaft 201 is revolved, the levers 206 will be oscillated to elevate the bars 203, whereby the weight of the molds 200 will be transferred from the movable table 196 to the bars 203.

Formed on the upper face of the table 196 are ratchet teeth 210 and coöperating with said teeth is a gravity pawl 211, pivoted to a mold pushing plate 212, the latter being slidably connected with the guide frame 197 and adapted to bear against the last of the molds 200, as shown. Secured to the shaft 201 is a table operating frame 213, the latter being formed with an elongated recess 214 in which is positioned a fixed pin 215, carried by the table 196.

By this construction, when the shaft 201 is rotated by the segment 191, the side bars 203 will be elevated to receive the weight of the molds 200, this action taking place before the crank 213 is thrown back into operation. After the bars 203 have been elevated, the crank element 213 will contact with the fixed pin 215, so that the movement of said crank will push the table 196 forwardly. Movement of the table will impart a corresponding movement to the plate 212, by reason of the pawl and ratchet construction 210 and 211, whereupon one of the molds 200 supported by the bars 203 will be discharged from the latter to a position upon the rack bars 112. The continued operation of the cam 186 will result in returning the mold feeding elements to their initial or normal position. However, it will be noted that the return of the table 196 to its normal position will not result in the return of the plate 212, this being due to the fact that the pawl 211 of said plate will merely ride freely over the ratchet teeth 210 when the table 196 is moving rearwardly, thus keeping the plate 212 in contact with the last of the molds 200 so that the plate will be in a position to effect the discharge of the mold upon the next operation of the cam 184. While means have been disclosed for the reception of ten empty molds, it will be understood that this figure will be subject to modification.

As previously described, when a bunch filled mold arrives at its lowermost point of movement, it will be received by the oscillating frame 160, so that said mold will be transferred from its position upon the movable rack bars to the oscillating frame, this action being effected by the fact that the studs 113 moved downwardly a sufficient distance to deposit the mold upon the lowermost bar 220 of the oscillating frame 160. When the filled mold is positioned upon the oscillating frame, the cam 156 will then be thrown into operation to revolve the oscillating frame by mechanism previously described. When the frame 160 is revolved it will carry in unison therewith the bunch filled mold, and the movement of said frame is continued until the same assumes a substantially horizontal position, with vertical bars 221 of the frame disposed on opposite sides of a fixed table 225 secured to the base 1. It will be noted that the bars of the frame, when oscillated, will lie beneath the plane of the table 225, so that the mold carried by the frame will be deposited upon said table. Before the frame 160 again resumes its vertical position, mechanism is provided for transferring the mold deposited upon the table 225 to a cover supplying mechanism 226, to be hereinafter fully described.

The means for transferring a mold from the table 225 to the cover mechanism 226 preferably consists of a bell crank lever 230, pivoted as at 231 upon the base 1. One extremity of the lever engages within a groove provided in the cam 155, so that the rotation 232 of the latter will result in oscillating the lever 230. Pivotally secured to the opposite extremity of the lever 230 is a link, 233 which, in turn, is pivoted to the outer extremity of a crank arm 234, fixed to a rotatable shaft 235, the latter being mounted in suitable bearings fixed to the base 1. Thus the operation of the cam 155 will result in the partial rotation of the shaft 235. Secured to the opposite extremity of the shaft 235 is a second crank arm 236, which has pivotally connected to the lower end thereof a dog 237, the latter being provided with a notch 238 for the reception of a projection 239 formed on a mold pushing device 240. The dog 237 is normally out of engagement with the projection 239, by reason of the same contacting with a fixed pin 241 provided on the shaft supporting bracket 242, thus permitting the pushing device to move independently of the dog when the crank arm 236 is in retreated position, for a reason which will appear hereinafter. However, when the arm 236 is advanced by the operation of the cam 155, the dog 237 will be released from contact with the pin 241, thus permitting the same to gravitate into engagement with the projection 239, in order that the pushing device 240 will operate in unison with the crank arm 236.

The mold pushing device 240 normally rests upon a plate 243 when in its retreated position, however, the movement of the arm 236 results in advancing the device 240 on a horizontal plane until the same contacts with the mold resting upon the table 225, whence the continued movement of the pushing device will remove the mold from the table 225 to a position in registration with the cover supplying mechanism 226. After this operation has been effected, the oscillating frame 90 will be restored to its vertical position by the action of the cam 156.

The cover supplying mechanism 226 is thrown into operation when the cam 157 is rotated, said cam being provided on its rear face with a trip 250, which is adapted to contact with an oscillating lever 181 keyed to the shaft 13, in order that the latter may be partially rotated. This movement of the shaft 13 is transmitted to a releasing arm 251 keyed to the opposite extremity of the shaft 13, in order that the releasing arm may be oscillated. The drive shaft 3 is provided with the pinion 254 which meshes with an enlarged gear 255, rotatably mounted in a bearing 256 secured to the base 1. The gear 255 rotates a shaft 257 having a reduced pinion 258 rotatable therewith, the pinion 258 in turn meshing with an enlarged gear 259 also, rotatably mounted in said bearing. The gear 259 rotates a similar gear 260 loose upon a horizontally extending counter shaft 261. Rotatable with the gear 260 is an internal ratchet member 263 which is free to rotate about the shaft 261. Keyed to the shaft 261 is a pawl carrying plate 264 having pivotally mounted thereon a pawl 265, which is operable to engage with the ratchet teeth of the member 263. However, the pawl 265 is normally kept out of engagement with the ratchet 263 by the action of the arm 251, which contacts with the under face of the pawl 265 so as to retain the latter elevated. However, when the oscillating lever 281 is operated, the arm 251 will be revolved to a position independent of the pawl 265, in order that the latter will coöperate with the ratchet member 263 and will thereby couple shaft 261 with the revolving ratchet member 263, in order that the shaft 261 will revolve. The rotation of the shaft 261 results in the operation of the cover supplying mechanism 226 to be hereinafter fully set forth.

The mechanism 226 in its preferred form embodies a guide frame 270 for the reception of a plurality of superimposed mold covers 271, the latter being fed downwardly by successive stages toward a bed 272, situated in vertical alinement with respect to said guide frame. The guide frame terminates in spaced relation with regard to the bed 272, in order that a mold may be discharged from the table 225 and deposited upon the bed 272. Rotatable with the shaft 261 is a cam 275, having a guide groove 276 in which is operable one arm of a bell crank lever 277, the latter being pivoted as at 277ª to a fixed support. Carried by the outer extremity of the opposite arm of the lever 277 is a link 278, which, in turn, is pivotally connected to a crank arm 280, the latter being fixed to a shaft 281 rotatably mounted in bearings formed in the bed construction 272. Mounted upon the shaft 281 is a second lever arm 282 which is pivotally connected to an oscillating lever 283. Thus the oscillation of the lever arms 282 and 283 is effected by the rotation of cam 275. Pivoted to the extremities of the levers 281 and 282 are cover gripping levers 285, the latter being employed to engage the outer edges of one of the mold covers 271, in order to conduct the latter from the guide frame 270 to a position upon a mold supported by the bed 272. A second cam 286 is secured to the shaft 261 at a point adjacent to the cam 275. A tappet 287, on a lever 288, engages on the said cam, said lever being pivoted as at 289 upon the guide frame 270. A corresponding lever 290 is pivotally connected with the lever 288 as at 291 and is also pivoted as at 292 upon the frame 270. A spring 293 is secured to the frame 270 and to the pivotal point 291 to maintain the levers 290 and 288 in normal position. Said levers are provided with downwardly extending arms 294 having slots 295 formed therein, and operable within the slots are the upper extremities of cranks 296 which are movable in unison with the cover gripping levers 285. By this construction it will be seen, that the cam 275 will move the cover gripping levers 285 vertically, while the cam 286 will control the inward and outward movement of said levers.

When a bunch filled mold is positioned upon the bed 272, the levers 285 are elevated to grip the opposite edges of the lowermost mold carried within the guide frame 270. However, upon the operation of the cam 275 the levers 285 will be lowered, carrying a cover in connection therewith. The lowering of the levers 285 is continued until after a cover is positioned upon the mold supported by the bed 272, whereupon said gripping levers will be spread apart, by the action of the cam 286, so that the levers 285 will be free of the cover deposited upon the mold. While in their spread position, the levers 285 will be again elevated until in a position in alinement with the cover 271 immediately above that just deposited upon the bunch filled mold. When in this position, the arms 285 are moved inwardly to engage with the cover above the mold cover, so as to be positioned for a subsequent operation. It will be noted that the covers carried by the frame 270 are fed downwardly by gravity and are supported by the action of the cover gripping levers 285. A cover supplied mold is discharged by a mechanism to be hereinafter set forth, from the bed 272 to a cover pressing device.

In order that the cover supplied mold may be removed from the bed 272 to a position in registration with cover pressing mechanism 300, the mold pushing device 212 is provided with a horizontally extending rack bar 301, mounted in guides 302 permanent with the base 1. It is through the movement of the rack bar 301 that the pushing device 212 is moved sufficiently to thrust a mold deposited upon the table 225 to the base plate 303 of the cover pressing mechanism, as it will be apparent that the movement of the arm 234 will be clearly sufficient to carry a mold from the table 225 to the bed 272. The rack bar 301 is operated through the agency of a gear 305 fixed to the shaft 261, said gear meshing with a similar gear 306 keyed to a cross shaft 307, rotatable in bearings 308 provided on the base 1. Secured to the opposite extremity of the cross shaft 307 is a gear 309 which meshes with a similar gear 310, mounted on a shaft 311, journaled in a bearing 312 secured to the base 1. Rotatable with the shaft 311 is a cam 315 having a cam groove provided therein. Pivoted to the bracket 312 is a cam actuated segment 316, having a portion 317 thereof operable within the groove of the cam 315, so that the rotation of the latter will result in oscillating the segment 316 about its pivot. A spring 318 is employed to retain the segment 316 in its normal position. Meshing with the toothed portion of said segment is a pinion 320, secured to a stud shaft 321, the latter being rotatable in bearings provided in the bracket 312. The inner extremity of the shaft 321 is provided with a gear 322 which meshes with the rack teeth of the member 301. By this construction it will be manifest that the movement of the shaft 307 and its associated segment 316 will result in revolving the gear 232 and will thereby move the rack bar 301 and its connected mold pushing device 240, in order to effect the removal of a bunch filled mold from the bed 272 in order that the same may be deposited upon the base plate 303. After this operation has been completed, the continued operation of the cam 315 will return the mold pushing device to its initial position above the bed 272, whence it is further retracted to its normal position by the operation of the cam 255, as will be clearly understood.

After a mold has been deposited upon the base plate 303, the mechanism of pressing the cover thereof tightly down upon the mold, in order to complete the shaping of the bunches carried within the mold, is thrown into operation. This mechanism preferably consists of pressed cranks 325, which are formed with circular bores for the reception of crank cams 326 revoluble with the cross shaft 307, the cams being eccentrically mounted upon said shafts so that the movement of the latter will result in the vertical movement of a pressing plate 327, the latter being movable in slotted brackets 328 secured to the base 1. By this construction, the pressing plate 327 will be operated to force a cover tightly down upon a mold, so that the cigars or bunches provided in the latter will be pressed with sufficient force to destroy the natural resiliency of the tobacco, and to thereby give the bunches definite and permanent form, so that a wrapper may be readily applied thereto.

Mounted upon the base 1 are bearings 330 in which is rotatably journaled a shaft 331, having rollers 332 carried thereby. A pulley 334 is secured to the shaft 331, and over which is trained the belt 335, the latter extending to a pulley 336 mounted on the cross shaft 307. The rollers 332 are employed to conduct the mold to a mold conveying device 337. However, it is well to state here that pressed molds are discharged from the base plate 303 by the insertion of a fresh mold upon said plate and that the action of the incoming mold will force the pressed mold into engagement with the rollers 332.

The mold conveying mechanism is utilized to convey finished bunches from the relatively inaccessible cover pressing device to a point on the machine whereby they may be conveniently collected. The mechanism 337 in its preferred embodiment consists of vertical uprights 340 and 341 having journaled in the upper extremities thereof a cross shaft 341. The shaft 341 is intermittently rotated through the medium of a miter gear 342 keyed to the shaft 261, said gear meshing with a similar gear 343 journaled in the bearing 345. Rotatable with the gear 343 is a crank 346 having pivotally connected to the upper end thereof a link 347. Said link has its upper extremity swiveled or otherwise secured to the outer end of a pawl carrying crank 348, loose upon the shaft 341. A spring pressed pawl 349 is pivoted to the crank 348 and is operable to engage with the ratchet wheel 350 keyed to the cross shaft 341. By this construction it will be seen that the reciprocating movement of the link 347 will result in imparting an intermittent movement to the cross shaft 341, the latter being prevented from unduly rotating by the action of a locking pawl 351 carried by the upright 340. Mounted upon the shaft 341 are sprockets 352, formed in spaced relation, and trained over such sprockets are chains or their equivalent 353, the latter extending to similar sprockets 354 carried by a lower shaft 355, journaled in the vertical uprights 340. The chains 353 have suitably connected therewith brackets or the like 356, which are adapted to receive the molds after the latter are discharged from the rollers 332, so that the molds will be lifted from the lower portion of the machine to a position for convenient collection. Attention is called to the fact that the mold covering, pressing and conveying mechanism operates relatively slow in comparison with the mechanism for supplying cigar bunches to a mold. This is due to the fact that 20 cigars or any other suitable number must be placed in a mold before the same is discharged upon the table 225, thus giving the rear mechanism ample time to perform its required function before being ready to receive another mold.

It will thus be seen that there is provided mechanism in which the objects of this invention are achieved and all of the advantageous features above mentioned are, among others, present. The apparatus is positive in operation and so constructed as to be conveniently repaired in the event of accidents occurring to the several parts thereof.

While I have herein shown and described a preferred embodiment of my invention, I would have it understood that changes may be made in the form, proportion and construction of the several parts, without departing from the spirit of my invention, and within the scope of the appended claims.

Having described the invention, what I claim as new is:—

1. In a cigar bunch forming machine, the combination with a mold receiving table, means for feeding molds at predetermined periods to a mold guide, means for depositing bunches in cavities formed in said mold when the latter is positioned in said guide, and means for removing said mold from said guide after the same has been filled with bunches.

2. A cigar bunch forming machine, comprising a bunch rolling mechanism, means for transferring bunches discharged from said rolling mechanism to a bunch receiving mold, means for supplying a bunch filled mold with a cover, mechanism for pressing said cover upon said mold, and means for conveying said mold and cover to a point of collection.

3. In a cigar bunch making machine, the combination of a manually supplied bunch rolling mechanism, of means for rolling the bunch upon the operation of said rolling mechanism and for associating a binder therewith, means for transferring the rolled bunch from said rolling mechanism to a bunch receiving mold, and filling the same, of means for placing a cover upon said mold after the latter has been filled with bunches, bunch pressing mechanism operative to force said cover down upon said mold, and means for conducting said pressed mold to a position upon the machine whereby the same may be conveniently collected.

4. In a cigar bunch forming machine, the combination with a mold receiving table, means for feeding the molds at predetermined periods to a mold guide, means for depositing bunches into cavities formed in said molds when the latter are positioned in said guide, and means for removing said molds from said guide after the same have been filled with bunches.

5. In a cigar bunch forming machine, the combination with a mold receiving table, means for feeding the molds at predetermined periods to a mold guide, means for depositing bunches into cavities formed in said molds when the latter are positioned in said guide, means for removing said molds from said guide after the molds have been filled with bunches, and means for operating said mold feeding mechanism to deposit an empty mold in said guide after a filled one has been discharged therefrom.

6. The combination with a vertically movable mold, and a guide therefor, the former having a plurality of bunch shaped openings formed in spaced vertical arrangement therein, means for supplying bunches to said opening by intermittent stages, means for discharging a filled mold from the mold receiving guide and means for substituting an empty mold in place of the discharged one.

7. The combination with a vertically movable mold, having a plurality of alining bunch receiving openings formed therein, a guide for receiving said mold, means for intermittently moving said mold downwardly in said guide, means for supplying one of the openings of said mold with a bunch subsequent to each movement of said mold, and means for removing a bunch filled mold from said guide.

8. The combination with a plurality of molds, a guide for the reception of one of said molds, means for intermittently supplying bunches to bunch receiving openings formed in said guide supported mold, automatic mechanism for discharging a bunch filled mold from said guide and means for replacing the discharged mold by an empty one.

9. The combination with a movable mold, having a series of vertically alining openings formed therein, a guide for receiving said mold, means for intermittently supplying cigar bunches to said guide supported mold, means for moving the latter so that an unfilled opening thereof will be in registration with said bunch supplying means upon each successive operation of the latter, automatic means for discharging the filled mold from said guide and means for substituting an empty one in lieu thereof.

10. In mold supplying mechanism, the combination with a table for supporting a plurality of empty molds, means for depositing at predetermined intervals, a mold upon a vertically movable supporting member, mechanism for inserting bunches into spaced openings formed in said mold, means for discharging filled molds from said supporting member and to deposit empty molds thereon.

11. In a mold supplying mechanism, the combination with a vertically movable mold carrying member, means for depositing bunches into spaced openings formed in said molds, means for discharging filled molds from said carrying member and to replace the filled mold with an empty mold, said mold replacing mechanism consisting of a supporting frame for the reception of a plurality of empty molds, and means for depositing one of the empty molds carried by the supporting frame upon the mold carrying member.

12. The combination with mold feeding mechanism, of means for depositing bunches into a movable mold, a guide for the reception of said mold while the latter is receiving bunches, and means for discharging a bunch filled mold from said guide to a cover supplying mechanism.

13. In a combination with a mold feeding mechanism, of means for depositing bunches into a movable mold, a guide for the reception of said mold when the latter is receiving bunches, means for discharging a bunch filled mold from said guide and to deposit the same upon a mold receiving table, means for conveying said mold from said table to a cover supplying mechanism, and means for actuating the cover mechanism to position the cover upon said mold.

14. The combination with a mold feeding mechanism, of means for depositing bunches into a movable mold, a guide for the reception of said mold, when the latter is receiving bunches, means for discharging a bunch filled mold from said guide and to deposit the same upon a mold receiving table, means for conveying said mold from said table to a cover supplying mechanism, means for actuating the cover mechanism to position the cover upon said mold, and means for conducting the cover supplied mold to a bunch pressing mechanism.

15. The combination with a mold feeding mechanism, of means for depositing bunches into a movable mold, a guide for the reception of said mold, when the latter is receiving bunches, means for discharging a bunch filled mold from said guide and to deposit the same upon a mold receiving table, means for conveying said mold from said table to a cover supplying mechanism, means for actuating the cover mechanism to position the cover upon said mold, means for conducting the cover supplied mold to a bunch pressing mechanism, and means for conveying said pressed mold to a position whereby the same may be conveniently collected.

In testimony whereof I affix my signature.

EDWARD P. HUTTGER.

Copies of this patent may be obtained for five cents each, by addressing the "Commissioner of Patents, Washington, D. C."